US012181207B2

(12) United States Patent
Oh

(10) Patent No.: US 12,181,207 B2
(45) Date of Patent: Dec. 31, 2024

(54) REFRIGERATOR

(71) Applicant: LG Electronics Inc., Seoul (KR)

(72) Inventor: Changseok Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/241,437

(22) Filed: Sep. 1, 2023

(65) Prior Publication Data

US 2023/0408171 A1 Dec. 21, 2023

Related U.S. Application Data

(63) Continuation of application No. 17/368,032, filed on Jul. 6, 2021, now Pat. No. 11,774,165.

(30) Foreign Application Priority Data

Aug. 18, 2020 (KR) ........................ 10-2020-0103134

(51) Int. Cl.
*F25D 23/02* (2006.01)
*E05D 11/00* (2006.01)
(Continued)

(52) U.S. Cl.
CPC ........ *F25D 23/028* (2013.01); *E05D 11/0054* (2013.01); *E05D 11/0081* (2013.01);
(Continued)

(58) Field of Classification Search
CPC ...... F25D 23/028; F25D 23/061; F25D 23/02; F25D 2323/024; F25D 2400/40;
(Continued)

(56) References Cited

U.S. PATENT DOCUMENTS 6,350,956 B1 * 2/2002 Sakata ................ B60R 16/0215 174/101
8,307,502 B2 * 11/2012 Bonomie .................. E05D 7/04 16/248

(Continued)

FOREIGN PATENT DOCUMENTS

CN 105486010 4/2016
CN 107883662 4/2018

(Continued)

OTHER PUBLICATIONS

Extended European Search Report in European Appln. No. 21188991.0, dated Jan. 14, 2022, 7 pages.

(Continued)

*Primary Examiner* — Hanh V Tran
(74) *Attorney, Agent, or Firm* — Fish & Richardson P.C.

(57) ABSTRACT

A refrigerator includes a cabinet, a mounting bracket disposed at a top surface of the cabinet, a door configured to rotate relative to the cabinet, a hinge cover that is disposed at the top surface of the cabinet and covers the mounting bracket, a hinge including a door bracket disposed at the door, a hinge bracket disposed at the mounting bracket, and a plurality of links that connect the door bracket to the hinge bracket, a guide device having a first side disposed at the door and a second side that passes through a cover opening at a front surface of the hinge cover and is disposed inside the hinge cover, and an electric wire or a water pipe disposed along an inside of the guide device.

17 Claims, 21 Drawing Sheets

(51) Int. Cl.
*F25D 11/02* (2006.01)
*F25D 23/06* (2006.01)
*F25D 25/02* (2006.01)

(52) U.S. Cl.
CPC ............ *F25D 11/02* (2013.01); *F25D 23/061* (2013.01); *F25D 25/021* (2013.01); *E05D 2011/0072* (2013.01); *E05Y 2900/31* (2013.01)

(58) Field of Classification Search
CPC ............. E05D 11/0054; E05D 11/0081; E05D 2011/0072; E05Y 2900/31
See application file for complete search history.

(56) References Cited

U.S. PATENT DOCUMENTS

| | | | | |
|---|---|---|---|---|
| 8,366,220 | B2 * | 2/2013 | Oberhauser | E05D 3/16 312/405 |
| 9,115,928 | B2 * | 8/2015 | Akalan | F25D 23/028 |
| 9,790,721 | B2 * | 10/2017 | Ueyama | F25D 23/028 |
| 10,122,127 | B2 * | 11/2018 | Swanson | A47B 97/00 |
| 10,524,586 | B2 * | 1/2020 | Oh | E05D 11/0081 |
| 10,544,983 | B2 * | 1/2020 | Lee | F25D 23/028 |
| 11,091,943 | B2 * | 8/2021 | Ferreira | E05D 3/16 |
| 2010/0231111 | A1 * | 9/2010 | Kang | E05D 3/022 312/405 |
| 2013/0092802 | A1 * | 4/2013 | Doberstein | D06F 39/14 248/70 |
| 2013/0257238 | A1 * | 10/2013 | Herron | E05D 3/022 312/325 |
| 2014/0210328 | A1 | 7/2014 | Akalan et al. | |
| 2017/0350644 | A1 * | 12/2017 | Xia | H04N 23/66 |
| 2018/0187952 | A1 * | 7/2018 | Lv | E05D 11/0054 |
| 2018/0187956 | A1 * | 7/2018 | Kim | F25D 23/02 |
| 2019/0086141 | A1 * | 3/2019 | Kim | B21D 5/00 |
| 2019/0368247 | A1 * | 12/2019 | Carbone | E05D 3/14 |
| 2021/0055044 | A1 * | 2/2021 | Kraemer | F25D 21/04 |

FOREIGN PATENT DOCUMENTS

| | | | | |
|---|---|---|---|---|
| CN | 107883662 | A * | 4/2018 | |
| CN | 110130758 | | 8/2019 | |
| CN | 110130758 | A * | 8/2019 | |
| CN | 110398121 | | 11/2019 | |
| CN | 110398121 | A * | 11/2019 | |
| CN | 111121378 | | 5/2020 | |
| CN | 111121378 | A * | 5/2020 | |
| DE | 202008006133 | U1 * | 11/2008 | F25D 23/028 |
| EP | 2743435 | | 6/2014 | |
| EP | 2762815 | | 8/2014 | |
| EP | 3343152 | | 7/2018 | |
| EP | 3674504 | | 7/2020 | |
| KR | 10-2010-0054353 | | 5/2010 | |
| KR | 20100054353 | A * | 5/2010 | |
| KR | 101497295 | | 3/2015 | |
| KR | 101519144 | B1 * | 5/2015 | |
| KR | 10-2020-0067415 | | 6/2020 | |
| KR | 20200067415 | A * | 6/2020 | |
| KR | 10-2022-0099330 | | 7/2022 | |
| KR | 20220099330 | A * | 7/2022 | |
| WO | WO 2016/000466 | | 1/2016 | |
| WO | WO-2016000466 | A1 * | 1/2016 | E05F 15/63 |
| WO | WO 2018/127163 | | 7/2018 | |
| WO | WO 2018/164031 | | 9/2018 | |
| WO | WO-2018164031 | A1 * | 9/2018 | |

OTHER PUBLICATIONS

Office Action in Chinese Appln. No. 202110834985.8, dated Feb. 15, 2023, 6 pages.

Office Action in Chinese Appln. No. 202110834985.8, mailed on Sep. 29, 2023, 12 pages (with English translation).

* cited by examiner

REFRIGERATOR

CROSS-REFERENCE TO RELATED APPLICATIONS

The present application is a continuation of U.S. application Ser. No. 17/368,032, filed on Jul. 6, 2021, which claims priority under 35 U.S.C. 119 and 35 U.S.C. 365 to Korean Patent Application No. 10-2020-0103134, filed on Aug. 18, 2020, the disclosures of which are hereby incorporated by reference in their entirety.

TECHNICAL FIELD

The present disclosure relates to a refrigerator.

BACKGROUND

Refrigerators are home appliances for storing foods at a low temperature in an inner storage space covered by a refrigerator door. For example, the storage space can be cooled using cool air that is generated by heat-exchange with refrigerant circulating in a refrigeration cycle to store the foods in an optimal state.

In some examples, refrigerators may have increased sizes and provide multi-functions according to the change of dietary life and quality expectations. In some cases, refrigerators may include various structures and convenience devices in consideration of user convenience.

In some examples, a built-in type refrigerator may be embedded in the furniture of the kitchen. In some cases, a plurality of refrigerators may be installed in parallel to one another to provide a sense of unity as a whole and have harmony with the surrounding configuration.

In some cases, a hinge device may prevent or reduce an interference with adjacent components. For example, an interference may occur when the door rotates relative to another component due to a thickness of the door if the refrigerator is installed in close contact with the wall or furniture, or the refrigerators are continuously arranged in parallel to one another.

In some cases, a multi-link hinge may be when mounted on a refrigerator door and provide a compact rotation structure, and the multiple-link hinge may have multi joints so that the door may avoid an interference with adjacent objects.

In some cases, where a refrigerator includes the hinge structure, an electric wire and a water pipe may be exposed to an outside of the door or the hinge structure, an outer appearance of the refrigerator may not be good. In some cases, safety issues may occur due to the exposed electric wire or water pipe.

In some cases, a rotation trajectory of the door may increase by the hinge device, and the electric wire and the pipe may be disposed along a plurality of links of the hinge device. The electric wire and the water pipe may be caught in the hinge device and damaged.

SUMMARY

The present application describes a refrigerator including a hinge having a multi-link structure mounted on a door, where an electric wire and a water pipe are guided to the door without interference with the hinge.

The present application further describes a refrigerator including a hinge having a multi-link structure mounted on a door, where an electric wire and a water pipe are guided to the door without being exposed to the outside.

The present application also describes a refrigerator having a structure that guides an electric wire and a water pipe regardless of an opening angle of a door.

According to one aspect of the subject matter described in this application, a refrigerator includes a cabinet that defines a storage space, a mounting bracket disposed at a top surface of the cabinet, and a door configured to rotate relative to the cabinet to thereby open and close at least a portion of the storage space, where the door includes a hinge mounting portion and a guide device mounting portion that are disposed at a top surface of the door. The refrigerator further includes a hinge cover that is disposed at the top surface of the cabinet and covers the mounting bracket, where the hinge cover defines a cover opening at a front surface thereof facing the door. The refrigerator further includes a hinge including a door bracket disposed at the hinge mounting portion, a hinge bracket disposed at the mounting bracket, and a plurality of links that connect the door bracket to the hinge bracket. The refrigerator further includes a guide device having a first side that is disposed at the guide device mounting portion and a second side that passes through the cover opening and is disposed inside the hinge cover, and an electric wire or a water pipe that is disposed along an inside of the guide device.

Implementations according to this aspect can include one or more of the following features. For example, the guide device mounting portion can be recessed downward from the top surface of the door, and the hinge mounting portion can be further recessed downward from the guide device mounting portion. In some examples, the hinge and the guide device can be configured to be covered by a front surface of the door based on the door being closed.

In some implementations, the hinge mounting portion and the guide device mounting portion can define steps that are spaced apart from the cabinet, where the hinge mounting portion is disposed closer to the cabinet than the guide device mounting portion. In some examples, the door includes an outer case that defines a front surface of the door, a door liner that defines a rear surface of the door, a cap decor that defines at least one of the top surface of the door or a bottom surface of the door, and an insulator provided in a space defined by the outer case, the door liner, and the cap decor. The hinge mounting portion and the guide device mounting portion can be disposed at a top surface of the cap decor.

In some implementations, the hinge and the guide device pass through the cover opening. In some examples, the guide device passes through an upper portion of the cover opening, and the hinge is disposed vertically below the guide device and passes through a lower portion of the cover opening. In some implementations, the mounting bracket can include a horizontal portion fixed to the top surface of the cabinet and a vertical portion that extends from an end of the horizontal portion and is exposed through the cover opening, where the hinge is detachably coupled to the vertical portion of the mounting bracket.

In some implementations, the guide device mounting portion defines a door hole to which the guide device is rotatably coupled, where the door hole can guide the electric wire or the water pipe into the door. In some implementations, the hinge cover can include a rotation mounting portion that is disposed inside the hinge cover and rotatably supports an end of the guide device, where the end of the guide device is connected to the rotation mounting portion and configured to rotate relative to the hinge cover based on the door being opened and closed.

In some implementations, the hinge cover can include a slide accommodation portion disposed inside the hinge cover and configured to accommodate the guide device, the guide device is configured to be withdrawn from and inserted into the slide accommodation portion based on the door being opened and closed, respectively.

In some implementations, the guide device can include an electric wire guide including a pair of guide links that are rotatably connected to each other. The pair of guide links can include a first guide link connected to the cabinet and a second guide link connected to the guide device mounting portion and configured to rotate relative to at least one of the guide device mounting portion or the first guide link based on rotation of the hinge. In some examples, the guide device can include a guide bush that passes through the top surface of the door and is inserted into the door, where the guide bush is rotatably connected to an end of the second guide link and defines a draw-in path of the electric wire into the door.

In some examples, each of the pair of guide links can include an electric wire accommodation portion that extends in a longitudinal direction and accommodates the electric wire, where the electric wire accommodation portion has an open surface. Each of the pair of guide links can include a plurality of protrusions that are alternately arranged along upper and lower ends of the open surface of the electric wire accommodation portion and configured to restrict the electric wire from being separated from the electric wire accommodation portion.

In some implementations, the guide device can include a pipe guide that extends from the guide device mounting portion to an inside of the hinge cover, where the pipe guide defines a space that accommodates the water pipe, and the pipe guide is configured to be withdrawn from and inserted into the hinge cover based on the door being opened and closed, respectively. In some examples, the pipe guide can include a slide guide that extends to the inside of the hinge cover and passes through the cover opening, where the slide guide is configured to linearly move forward toward the door and backward into the inside of the hinge cover. The pipe guide can further include a rotation guide configured to rotate relative to the slide guide and the guide device mounting portion, where the rotation guide has a first end rotatably connected to a front end of the slide guide and a second end rotatably connected to the guide device mounting portion.

In some implementations, the guide device can include an electric wire guide that accommodates the electric wire along an inside thereof and includes a plurality of guide links rotatably connected to one another and configured to rotate relative to one another based on the door being opened and closed. The guide device can further include a pipe guide that accommodates the water pipe along an inside thereof and is configured to linearly move forward toward the door and backward to an inside of the hinge cover based on the door being opened and closed, respectively.

In some examples, an end of the electric wire guide and an end of the pipe guide can be rotatably connected to each other at the guide device mounting portion and communicate with each other. In some examples, the refrigerator can include a guide bush that is disposed at the guide device mounting portion and defines a through-hole guiding the electric wire and the water pipe into the door, where the guide bush defines a rotation center of an end of the electric wire guide and an end of the pipe guide that are connected to each other at the guide device mounting portion.

According to another aspect, a refrigerator includes a cabinet that defines a storage space, a mounting bracket disposed at a top surface of the cabinet, and a door configured to rotate relative to the cabinet to thereby open and close at least a portion of the storage space, where the door includes a hinge mounting portion and a guide device mounting portion that are disposed at a top surface of the door. The refrigerator further includes a hinge and a hinge cover that is disposed at the top surface of the cabinet and covers the mounting bracket, where the hinge cover defines a cover opening at a front surface thereof facing the door. The hinge includes a door bracket disposed at the hinge mounting portion, a hinge bracket disposed at the mounting bracket, and a plurality of links that connect the door bracket to the hinge bracket. The refrigerator further includes a guide device including (i) a slide guide that is disposed in the hinge cover and configured to linearly move relative to the hinge cover and (ii) a rotation guide having a first side disposed at the guide device mounting portion and a second side rotatably connected to the slide guide. The refrigerator further includes an electric wire or a water pipe that is disposed along insides of the slide guide and the rotation guide.

The details of one or more implementations are set forth in the accompanying drawings and the description below. Other features will be apparent from the description and drawings, and from the claims.

DETAILED DESCRIPTION

Hereinafter, detailed implementations will be described in detail with reference to the accompanying drawings. However, the scope of the present disclosure is not limited to proposed implementations of the present invention, and other regressive inventions or other implementations included in the scope of the spirits of the present disclosure can be easily proposed through addition, change, deletion, and the like of other elements.

A direction will be defined prior to the explanation. In the present disclosure, a direction facing a front surface of the door illustrated in FIG. 1 can be defined as a front direction, and a direction facing the inside of the refrigerator with respect to the front surface of the door will be defined as a rear direction. Further, a direction facing a bottom surface on which the refrigerator is installed will be defined as a downward direction, and a direction that is away from the bottom surface will be defined as an upward direction.

Figure 1:
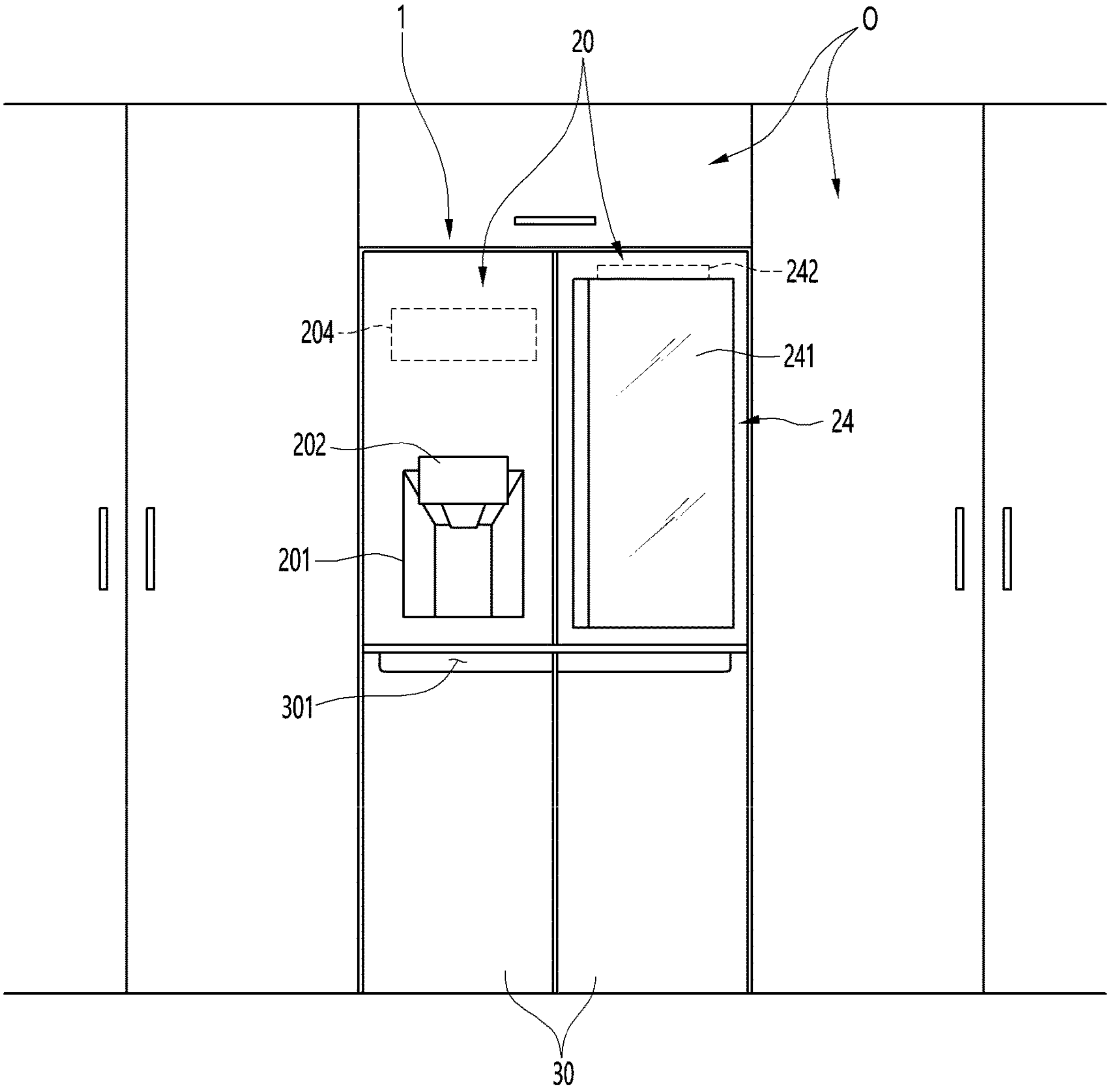
FIG. 1 is a perspective view illustrating an example state in which a refrigerator is installed.
Figure 2:
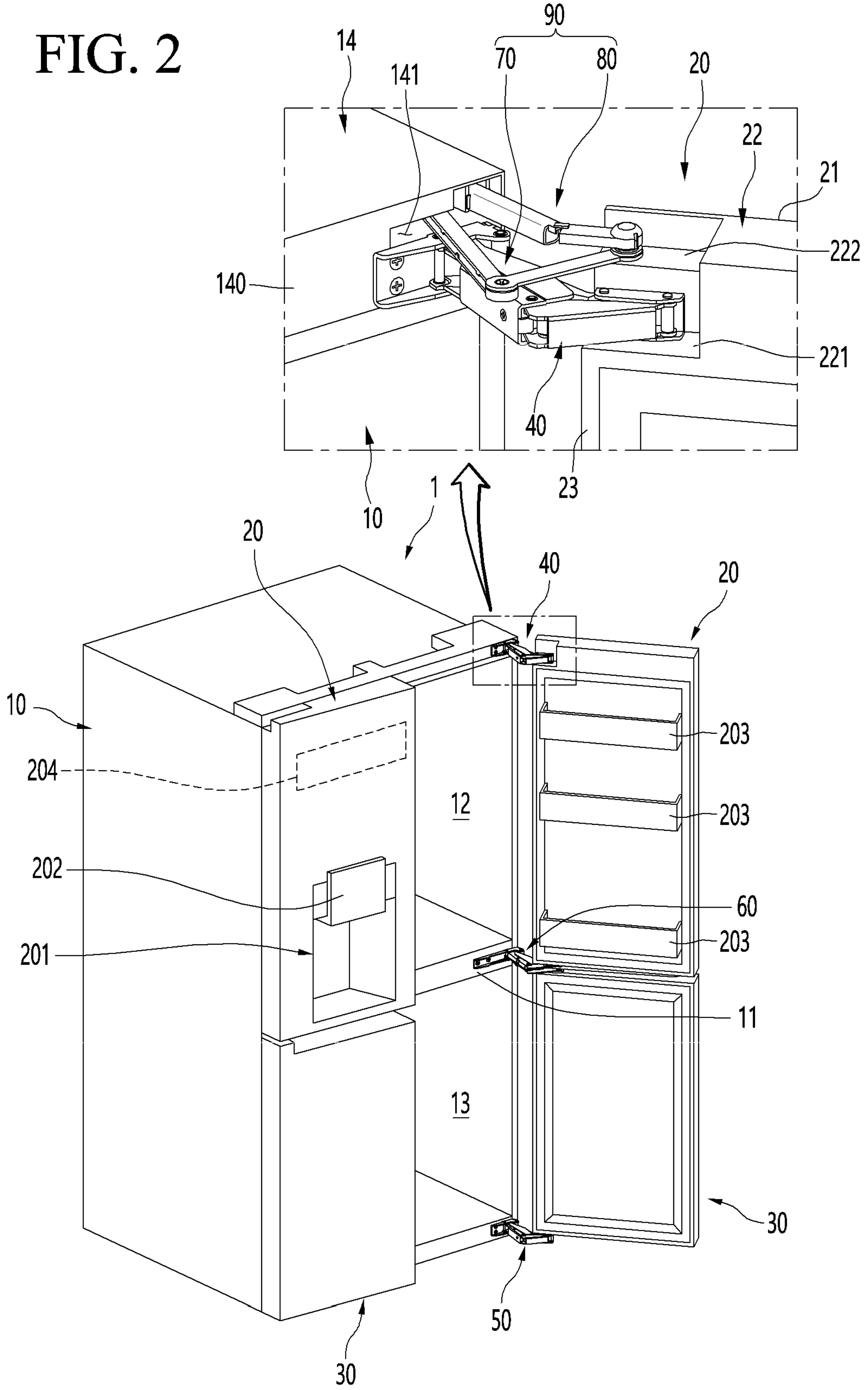
FIG. 2 is a perspective view illustrating the refrigerator with an example door being opened.

FIG. 1 is a perspective view illustrating an example state in which an example refrigerator is installed. FIG. 2 is a perspective view of the refrigerator with an example door that is opened.

In some implementations, a refrigerator 1 includes a cabinet 10 defining a storage space having an opened front surface and a door opening or closing the storage space. Here, an outer appearance of the refrigerator 1 can be defined by a cabinet 10 and doors 20 and 30.

In some examples, the refrigerator 1 can be mounted so as to harmonize with furniture or wall O of an indoor space. For example, as illustrated in FIG. 1, the refrigerator 1 can be installed in the indoor space such as a kitchen and can be disposed adjacent to the furniture or the wall O to harmonize with each other. That is, a space corresponding to a size of the refrigerator 1 can be provided in the furniture or the wall O, and the refrigerator 1 can be accommodated or disposed in a built-in type. In some examples, a plurality of refrigerators 1 can be continuously disposed, or other home appliances can be continuously disposed, in addition to the furniture or the wall O.

In such an arrangement structure of the refrigerator 1, a front surface of the refrigerator 1, i.e., front surfaces of the doors 20 and 30 can be very close to the furniture or the wall O and be disposed on the same or adjacent plane to realize a sensor of unity. In some cases, the front surface of the doors 20 and 30 are made of the same material or a material having the same texture as the furniture or the wall O to realize a sense of unity with the furniture or the wall O.

Looking in more detail with respect to a structure of the refrigerator 1, the cabinet 10 can define a storage space that is partitioned vertically. For example, the cabinet 10 can be partitioned vertically by a barrier 11 to define an upper storage space 12 above the barrier 11 and a lower storage space 13 below the barrier 11. For example, the refrigerator 1 can be provided in a bottom freeze type, and thus, the upper storage space 12 can be used as a refrigerating compartment, and the lower storage space 13 can be used as a freezing compartment. Thus, the upper storage space 12 can be referred to as a refrigerating compartment, and the lower storage space 13 can be referred to as a freezing compartment.

The implementations of this application can be applied to various types of refrigerators including a door that opens and closes a storage space by rotating regardless of the types of refrigerators. For example, in this disclosure, a bottom free type refrigerator will be described as an example for convenience of explanation and understanding.

The doors 20 and 30 can include an upper door 20 and a lower door 30, which open and close the upper storage space 12 and the lower storage space 13, respectively. The upper door 20 can be rotatably mounted on the cabinet 10 to open and close the upper storage space 12 by the rotation thereof. For this, upper and lower ends of the upper door 20 can be supported by a hinge 40 and a center hinge 60, respectively, and the upper door 20 can rotate by the hinge 40 and the center hinge 60 to open and close each of the storage spaces 12 and 13.

The upper door 20 can be provided in a pair on both left and right sides, and each of the upper doors 20 can independently rotate to open and close the upper storage space 12. In some examples, the hinge 40 and the center hinge 60 can be coupled to the pair of upper doors 20 disposed on both left and right sides, respectively, and can be rotatably mounted to the cabinet 10. The pair of upper doors 20 can include a left upper door and a right upper door.

In addition, an ice maker 204 that makes ices using automatically supplied water to separates and store the ice can be provided in the upper door 20. In addition, a dispenser 201 that is capable of dispensing water or ice at the outside of the upper door 20 in a state in which the upper door 20 is closed can be provided in the upper door 20. In addition, a display device 202 that displays an operation state of the refrigerator 1 and is directly manipulated to be input by a user can be provided on the upper door 20.

Therefore, for operations of the ice maker 204, the dispenser 201, and the display device 202, an electric wire connected to the ice maker 204, the dispenser 201, and the display device 202 can be drawn in the upper door 20. In some examples, a water pipe for supplying water to the ice maker 204 and/or the dispenser 201 can also be drawn in the upper door 20.

An opening passing through the upper door 20 can be defined in the upper door 20, and a storage member 203 can be provided in the opening. In addition, the upper door 20 can further include a sub door 24 that opens and closes the opening. The user can open the opening through the opening and closing of the sub door 24 to be accessible to the storage member 203. The sub door 24 can be rotatably coupled to the upper door 20, and in this case, the upper door 20 can be referred to as a main door because the upper door 20 opens and closes the storage space.

In addition, at least a portion of the sub door 24 can be selectively transparent to provide a see-through portion 241.

Thus, even when the sub door 24 is closed, the inside of the refrigerator, in which the storage member 203 is disposed, can be visibly recognized. For example, a door light 242 can be provided inside the opening, that is, a rear surface of the upper door 20. When the door light 242 is turned on by user's manipulation, a region in which the storage member 203 is disposed can be brightened, and the inside of the refrigerator can be visibly recognized through the sub door 24.

In some examples, the door light 242 and a sensor for the operation of the door light 242 can be connected to an electric wire 701 that is drawn into the upper door 20. In some examples, various electric components such as a heater for preventing dew condensation from being generated, a sensing device for sensing the user, and a microphone for inputting an operation can be further disposed in the upper door 20, and the above-described components can also be connected to the electric wire 701 that is guided into the upper door 20 so as to operate.

The lower door 30 can be rotatably mounted on the cabinet 10 to open and close the lower storage space 13 by the rotation thereof. For this, upper and lower ends of the lower door 30 can be supported by the center hinge 60 and a lower hinge 50, respectively, and the upper door 20 can rotate by the center hinge 60 and the lower hinge 50 to open and close each of the lower storage space 13.

The lower door 30 can be provided in a pair on both left and right sides, and each of the upper doors 20 can independently rotate to open and close the lower storage space 13. In some examples, the center hinge 60 and the lower hinge 50 can be coupled to the pair of lower doors 30 disposed on both the left and right sides, respectively, and can be rotatably mounted to the cabinet 10.

A handle or a handle space 301, into which a user's hand may be inserted, can be provided between a lower end of the upper door 20 and an upper end of the lower door 30. In some examples, a handle for manipulating the opening and closing of the upper door 20 and the lower door 30 can be disposed on a top surface of the handle space 301, i.e., a bottom surface of the upper door 20 and a bottom surface of the handle space 301, i.e., a top surface of the lower door 30. For example, the handle can be recessed in a groove shape.

The hinge 40, the center hinge 60, and the lower hinge 50 can rotate in the same trajectory, and a multi-link structure can be provided so that the upper door 20 and the lower door 30 smoothly rotate without an interference with the furniture or the wall O while opened and closed.

In some examples, a hinge cover 14 can be disposed on the top surface of the cabinet 10. The hinge cover 14 can extend from a left end to a right end of the cabinet 10 and can be configured to completely accommodate the mounting bracket 48 connected to the upper hinge 40 disposed on each of both left and right sides. In addition, when the mounting bracket 48 is integrated with the upper hinge 40, a portion of the upper hinge 40 fixed to the cabinet 10 can be accommodated inside the hinge cover 14.

The hinge cover 14 can define a circumferential surface extending downward along a circumference of the top surface and can define a space with an opened bottom surface. Thus, a space in which the mounting bracket 48 is accommodated, and the electric wire 701 and the water pipe 801 that are drawn into the upper door 20 are disposed can be provided. Particularly, a connector 702 of the electric wire 701 guided to a guide device 90 to be described below can be connected in an inner space of the hinge cover 14.

A front surface 140 of the hinge cover 14 can be disposed on the same plane as a front surface of the cabinet 10. In some examples, a cover opening 141 can be defined in each of both sides of the front surface 140 of the hinge cover 14. The cover opening 141 can be opened at a position corresponding to the upper hinge 40, and the mounting bracket 48 can be exposed to be connected to the upper hinge 40. In addition, the guide device 90 for guiding the electric wire 701 and the water pipe 801 to the inside of the upper door 20 can also pass through the cover opening 141 and then be connected to the upper door 20. In some cases, the guide device 90 can guide one or both of the electric wire 701 and the water pipe 801.

Hereinafter, the mounting structure of the upper hinge 40 will be described in more detail with reference to the drawings. In addition, for convenience of understanding and explanation, the upper door 20 will be referred to as a door 20, and the upper hinge 40 will be referred to as a hinge 40.

Figure 3:
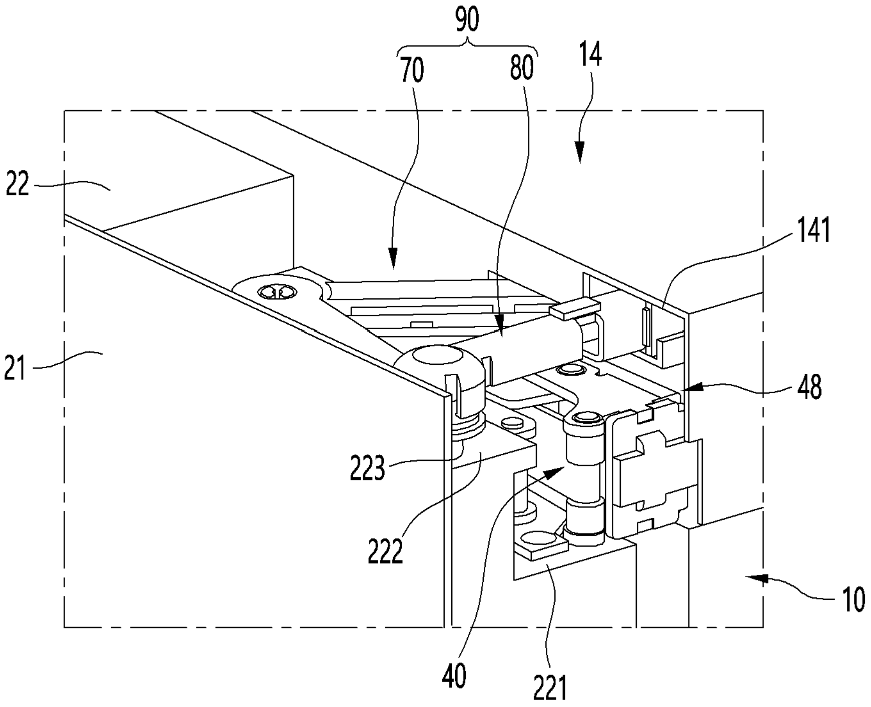
FIG. 3 is a partial perspective view illustrating an example of a hinge in a state in which the door is closed.
Figure 4:
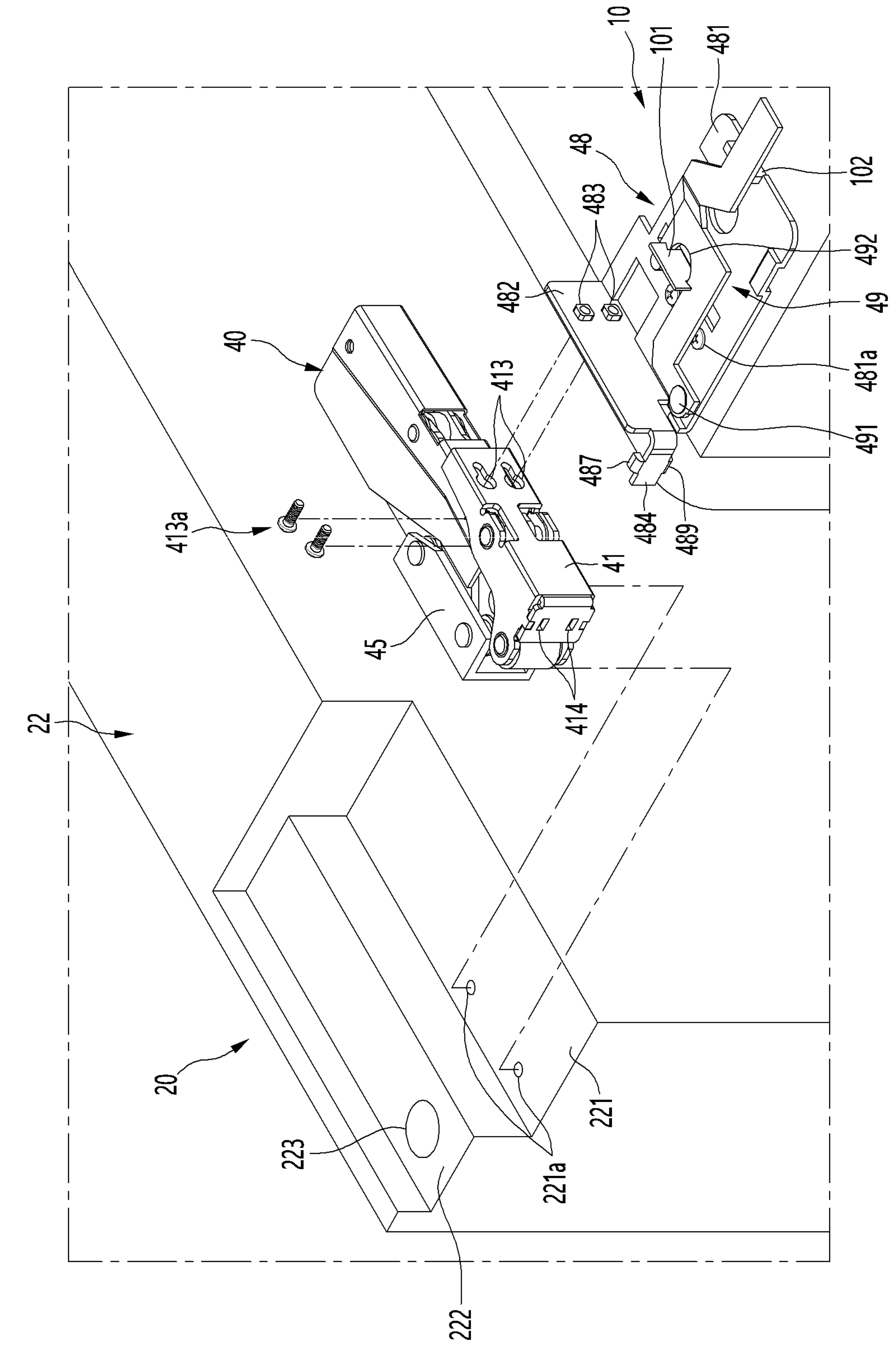
FIG. 4 is an exploded perspective view illustrating an example of a coupling structure of the door and the hinge.

FIG. 3 is a partial perspective view illustrating an example state in which the hinge is mounted in a state in which the door is closed. FIG. 4 is an exploded perspective view illustrating an example of a coupling structure of the door and the hinge.

As illustrated in the drawings, the mounting bracket 48 can be mounted on a top surface of the cabinet 10. The mounting bracket 48 can be configured to allow the hinge 40 to be fixed and mounted on the top surface of the cabinet 10 and can be accommodated inside the hinge cover 14.

The mounting bracket 48 can include a horizontal portion 481, a vertical portion 482, and a fixing lever 49.

In detail, the mounting bracket 48 can be made of a plate-shaped metal material and can be bent to provide the horizontal portion 481 and the vertical portion 482. The horizontal portion 481 can be seated on the top surface of the cabinet 10 and can be penetrated by first and second coupling ribs 101 and 102 protruding from the top surface of the cabinet 10.

In addition, the fixing lever 49 can be rotatably mounted on the horizontal portion 481 by a rotation shaft 491. The fixing lever 49 can have a rib restriction groove 492 that is capable of restricted with the first coupling rib 101 when rotating. Thus, the mounting bracket 48 can be selectively restricted to the top surface of the cabinet 10 according to the rotational operation of the fixing lever 49.

In some examples, a coupling member 481*a* such as a screw can be coupled to the horizontal portion 481, and the coupling member 481*a* can pass through the horizontal portion 481 and be coupled to the top surface of the cabinet 10 so that the mounting bracket 48 is more firmly coupled to the cabinet 10.

The vertical portion 482 can be vertically bent upward from a front end of the horizontal portion 481. The vertical portion 482 can be disposed on the same plane as the front surface of the cabinet 10 and can be exposed forward through the cover opening 141. Thus, the hinge 40 can be disposed on the same plane as the front surface of the cabinet 10.

In some examples, the vertical portion 482 can be coupled to the hinge bracket 41 of the hinge 40. For example, a through-hole 413 can be defined in the hinge bracket 41, and a coupling hole 483 can be defined in the corresponding vertical portion 482. Thus, a screw 413*a* can sequentially pass through the through-hole 413 and the coupling hole 183 so that the hinge bracket 41 is coupled to the front surface of the vertical portion 482.

A hinge restriction portion 484 can be disposed on one end of the vertical portion 482. The hinge restriction portion 484 can be vertically bent forward from a side end of the vertical portion 482 and can extend to support one side surface of the hinge bracket 41.

In some examples, restriction protrusions 487 and 489 protruding laterally can be further disposed on upper and lower ends of the hinge restriction portion 484. Each of the restriction protrusions 487 and 489 can be inserted into a restriction groove 414 defined in one side surface of the hinge bracket 41. Thus, the hinge bracket 41 can be further restricted by the hinge restriction portion 484, and the mounting bracket 48 can be maintained in the state of being firmly fixed and mounted. Particularly, each of rear and side surfaces of the hinge bracket 41 can be respectively restricted by the screw 413*a* and the restriction protrusions 487 and 489 and thus can be firmly fixed and mounted without moving even if the opening/closing of the heavy door 20 is performed.

The hinge 40 can include a door bracket 45 coupled to the door 20. In some examples, the door bracket 45 can be mounted on the top surface of the door 20 so that the door 20 is opened and closed according to the operation of the hinge 40.

The door 20 can include an outer case 21 defining a front surface, a door liner 23 defining a rear surface, and a cap decoration 22 defining a top surface and a bottom surface of the door 20. In some examples, a foam liquid can be injected into a space defined by a combination of the outer case 21, the door liner 23, and the cap decoration 22 to provide an insulator.

One end of the cap decoration 22 defining the top surface of the door 20 can be recessed to provide a space in which the hinge 40 is mounted. That is, a hinge mounting portion 221 on which the hinge 40 is mounted and a guide device mounting portion 222 on which the guide device 90 is mounted can be disposed in the top surface of the cap decoration 22.

In detail, the hinge mounting portion 221 and the guide device mounting portion 222 can be recessed from the top surface of the cap decoration 22 and can be sequentially provided in a stepped shape. That is, the hinge mounting portion 221 can be disposed further downward than the guide device mounting portion 222 and can be disposed further behind the guide mounting portion 222.

The hinge mounting portion 221 is recessed downward, and the bottom thereof can be provided in a flat shape. In some examples, a coupling hole 221*a* into which a screw coupled so that the door bracket 45 is fixedly mounted can be further defined in a bottom surface of the hinge mounting portion 221. Accordingly, the hinge 40 can be detachable from the door 20 according to the coupling and separation of the screw coupled to the coupling hole 221*a*, and the door 20 can be assembled to be mounted on or separated from the cabinet 10. That is, when the screw is removed, the hinge 40 can be separated from the cabinet 10, and in this state, services for transportation and maintenance can be performed.

The hinge mounting portion 221 can have a length corresponding to a horizontal length of the hinge 40 and can have a width corresponding to a width of the hinge 40 in a front and rear direction. That is, when the door 20 is closed, and thus, the hinge 40 is fully folded, the hinge 40 can be accommodated inside the hinge mounting portion 221.

In some examples, a height difference between the hinge mounting portion 221 and the upper guide device mounting portion 222 can be greater than a thickness of the hinge 40. Therefore, the hinge 40 can be disposed in an inner region of the hinge mounting portion 221, and the guide device 90 mounted on the guide device mounting portion 222 can be disposed above the hinge 40. Thus, even when the door 20 is opened and closed, the guide device 90 may not interfere with the hinge 40.

The guide device mounting portion 222 can be disposed above the hinge mounting portion 221 and can be recessed downward from a top surface of the cap decoration 22. In some examples, a recessed depth of the guide device mounting portion 222 can be greater than a height of the guide device 90. In addition, a length of the guide device mounting portion 222 can be defined as a length at which the electric wire guide 70, which is a component of the guide device 90, is capable of being accommodated when the door 20 is closed. For example, the length of the guide device mounting portion 222 can be equal to the length of the hinge mounting portion 221.

A bottom surface of the guide device mounting portion 222 can be provided in a flat shape, and a door hole 223 connected to the guide device 90 can be defined in the bottom surface of the guide device mounting portion 222. A guide bush 75 of the guide device 90, which will be described below, can be inserted and mounted inside the door hole 223 to provide a passage through which the electric wire 701 and the water pipe 801, which are guided through the guide device 90, are introduced into the door 20.

In the state in which the guide device 90 is mounted on the guide device mounting portion 222, a front upper end of the door 20 can protrude more than the guide device 90. That is, the upper end of the door 20 can extend higher than an upper end of the guide device 90 to shield the guide device 90 so as not to be exposed forward. In some examples, the hinge 40 disposed further lower than the guide device 90 can also be naturally shielded without being exposed through the front surface of the door 20.

Hereinafter, the structure and operation of the hinge 40 will be described in more detail with reference to the drawings.

Figure 5:
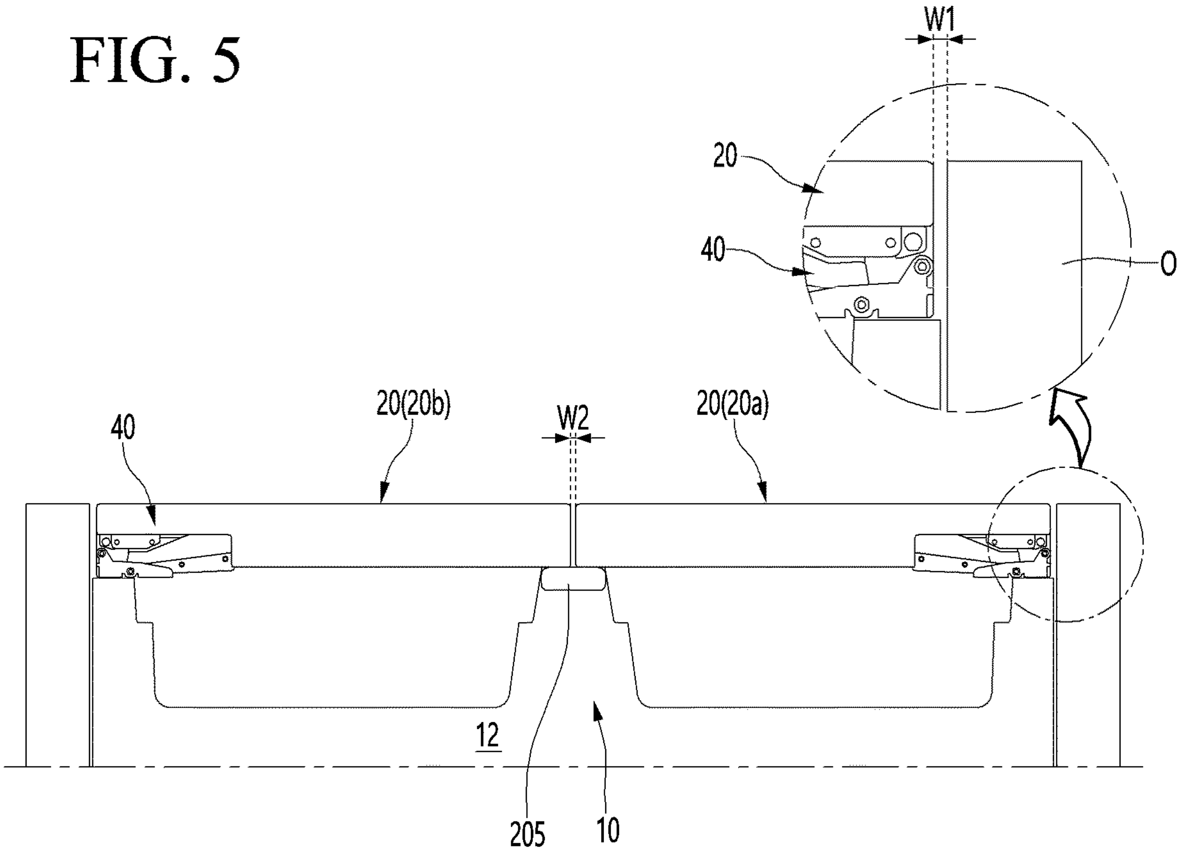
FIG. 5 is a view illustrating example states of the door, a wall, and an upper hinge in the state in which the door is closed.
Figure 6:
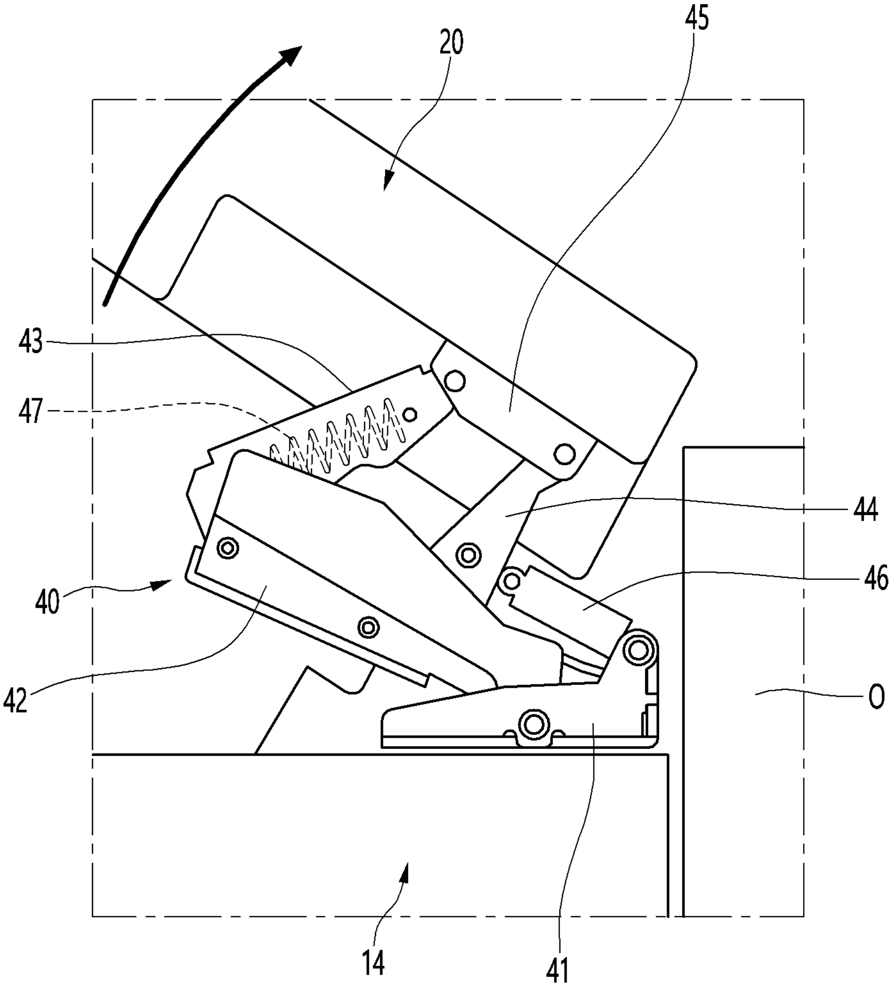
FIG. 6 is view illustrating example states of the door, the wall, and the upper hinge in a state in which the door is further opened compared to the state illustrated in FIG. 5.
Figure 7:
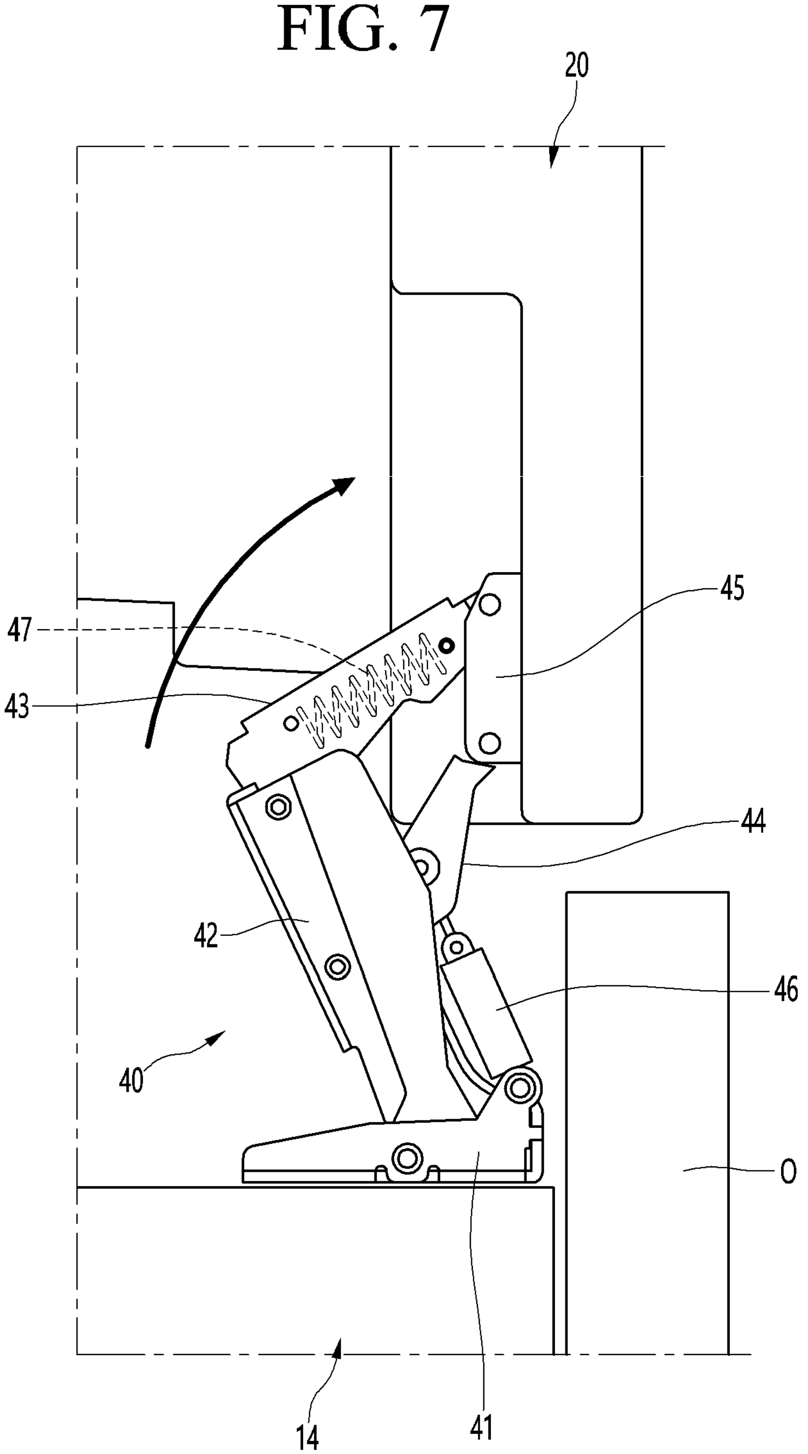
FIG. 7 is view illustrating example states of the door, the wall, and the upper hinge in a state in which the door is further opened compared to the state illustrated in FIG. 6.
Figure 8:
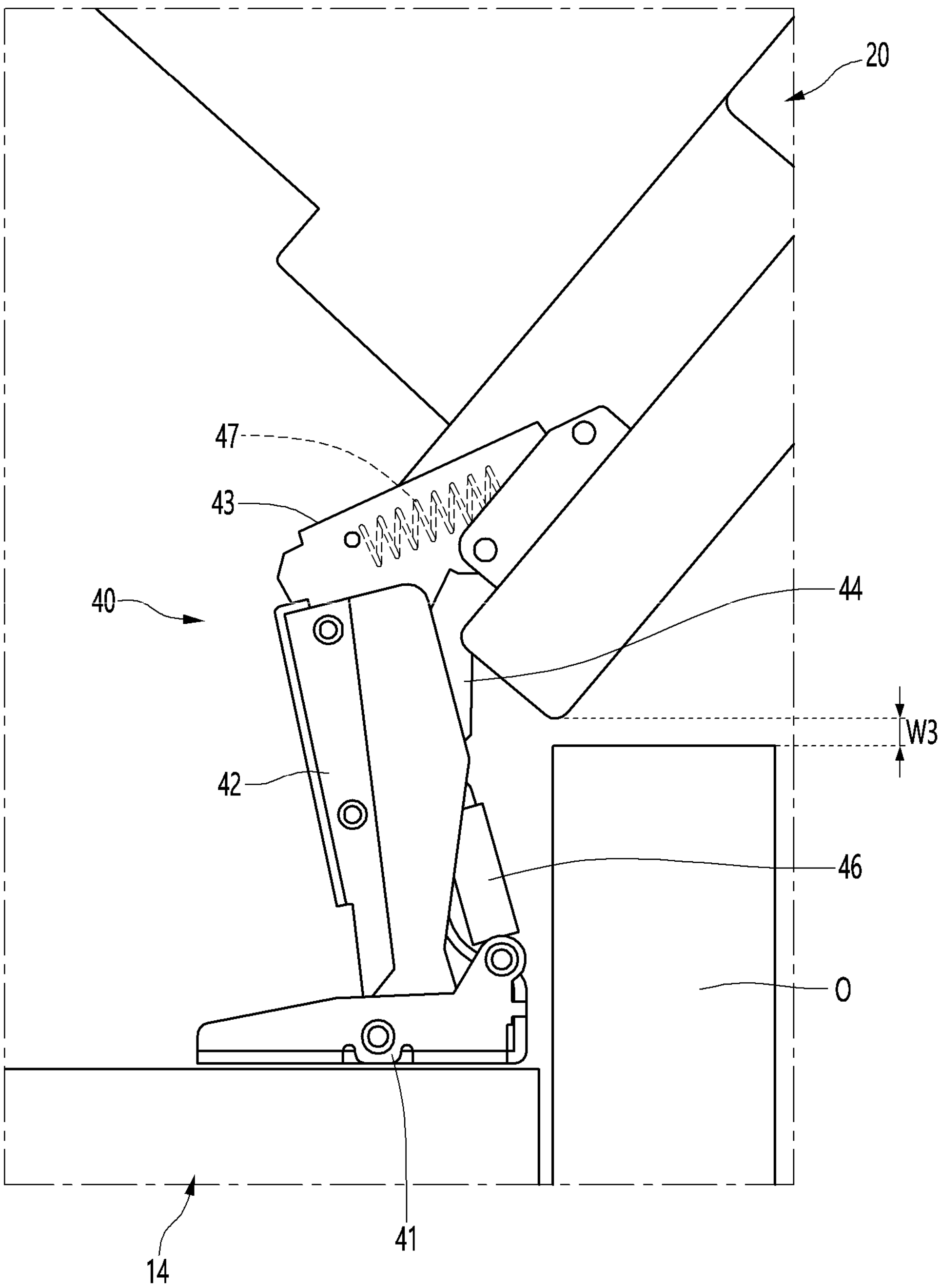
FIG. 8 is a view illustrating example states of the door, the wall, and the upper hinge in a state in which the door is fully opened.

FIG. 5 is a view illustrating example states of the door, a wall, and the upper hinge in the state in which the door is closed. FIG. 6 is view illustrating example states of the door, the wall, and the upper hinge in a state in which the door is further opened compared to the state illustrated in FIG. 5. FIG. 7 is view illustrating example states of the door, the wall, and the upper hinge in a state in which the door is further opened compared to the state illustrated in FIG. 6. FIG. 8 is a view illustrating example states of the door, the wall, and the upper hinge in a state in which the door 20 is fully opened.

As illustrated in the drawings, the hinge 40 can be mounted at a corner defined by an upper front end and a side end of the cabinet 10 and can be connected to one end of a top surface of the door 20.

The hinge 40 can have a structure in which a plurality of links are coupled to each other, and thus, when the hinge 40 rotates, the door 20 can rotate while moving in a direction away from the front surface of the cabinet 10.

The rotation trajectory of the door 20 can be determined by the structure of the plurality of links constituting the hinge 40, and a trajectory in which a pair of doors 20 disposed side by side and the furniture or wall O disposed at one side do not interface with each other can be implemented. Thus, the hinge 40 can be referred to as a multi-link.

In some implementations, the hinge 40, the lower hinge 50, and the center hinge 60 can have the same structure or a structure having the same rotation trajectory. Thus, the door 20 and the lower door 30 can rotate with the same rotation trajectory.

Looking at the structure of the hinge 40 in more detail, the hinge 40 can include a hinge bracket 41 mounted on the mounting bracket 48, a main link 42 axially coupled to the hinge bracket 41, a first sub link 43 and a second sub link 44, which are axially coupled to the main link 42, and a door bracket 45 which is axially coupled to ends of the first sub link 43 and the second sub link 44 and is coupled to the door 20.

Each of the links 42, 43, 44, and 45 can be axially coupled to define a quadrilateral shape as a whole and can be folded or unfolded to provide a trajectory through which the door 20 rotates. In some examples, the hinge bracket 41 and the second sub link 44 can be connected to each other by a linear damper 46 having both ends that are axially coupled to each other. The linear damper 46 can reduce rotation when the hinge 40 is folded, i.e., when the door 20 is closed to alleviate an impact.

In some examples, the first sub link 43 can be provided with a spring 47 that is tensioned or compressed according to the rotation of the first sub link 43 to force the rotation of the first sub link 43. The spring 47 can be a compression spring or a tension spring. The spring 47 can be compressed while the door 20 is closed and can be restored immediately before the door 20 is closed. Thus, the spring 47 can assist the rotation of the first sub link 43 at the moment at which the door 20 is closed by the spring 47. Therefore, the door 20 can be effectively closed even when the linear damper 46 operates.

In some examples, the plurality of links 42, 43, 44, and 45 constituting the hinge 40 can rotate while maintaining a set trajectory by the action of the linear damper 46 and the spring 47.

The pair of doors 20 can be disposed side by side on the front surface of the upper storage space 12. In some examples, the front surface of the door 20 can be spaced a set interval W1 from the furniture or the wall O disposed at both sides of the refrigerator 1. For example, the set interval W1 can be about 3 mm. Thus, while ensuring the initial rotation of the door 20 so as not to interfere, in the state in which the door 20 is closed, a space between the door 20 and the furniture or the wall O can be narrowed to realize the sense of unity.

The upper storage space 12 is shielded by the pair of doors 20, and the left and right doors 20 can independently rotate by the hinges 40, respectively.

Thus, a spaced space has to be defined between the left and right doors 20. In detail, the pair of doors 20 can have mutually independent rotational structures and can be spaced a set interval W2 from each other so as not to interfere with the rotation of the adjacent door 20 while the door 20 rotates. For example, the set interval W2 can be about 7 mm to about 8 mm. The set interval can be set differently according to a thickness of the door 20.

In some examples, a pillar 205 can be provided between the pair of doors 20 to shield the spaced space between the pair of doors 20. For example, the pillar 205 can be rotatably mounted to the door 20 on either side of the pair of doors 20. In some examples, the pillar 205 can be unfolded by a guide provided on the cabinet 10 while the door 20 is closed. In some examples, as illustrated in FIG. 5, when the door 20 is fully closed, the pillar 205 can be unfolded to shield the space between the doors 20.

In some examples, while the door 20 is opened, the pillar 205 can be folded by the guide provided on the cabinet 10 and may not interfere with other doors 20. In some examples, when the door 20 rotates, the door 20 may not interfere with the furniture or the wall O.

In detail, the hinge 40 rotates from the fully folded state of FIG. 5 to the state of FIG. 6 according to the rotation operation of the door 20. Here, while the door 20 is opened by a set angle, the door 20 can rotate while moving forward, and the pillar 205 can also rotate while moving forward so as not to interfere with other doors 20 disposed in parallel thereto. In some examples, a left end of the door 20*b* can also be maintained to be spaced apart from the furniture or the wall O so as not to interfere with each other. For this, the main link 42, the first sub link 43, the second sub link 44, and the door bracket 45, which constitute the upper hinge 40, can start to rotate.

In some examples, as illustrated in FIG. 7, the door 20 can gradually rotate to be opened. Here, the main link 42, the first sub link 43, the second sub link 44, and the door bracket 45 can rotate so that the end of the door 20 rotates so as not to interfere with the furniture or the wall O. That is, even when the door 20 rotate to be disposed parallel to the side surface of the cabinet 10, the end of the door 20 can rotate by the hinge 40 so as not to interfere with the furniture or the wall O.

As illustrated in FIG. 8, the door 20 can rotate up to a maximum open state at a set angle (for example, an angle between the front surface of the door and the front surface of the cabinet is about 130°). When the door 20 is fully opened, access to a storage member such as shelves and drawers inside the cabinet 10 is easy, and when the storage member is pulled in and out, the storage member can rotate up to an angle at which the storage member may not interfere with the door 20.

That is, when the door 20 fully rotates, the door 20 can be opened at the set angle so that an interference between the structure such as a door dike protruding along a circumference of a rear surface of the door 20 and the storage member disposed to be pulled in and out inside the refrigerator may not occur.

In some examples, when the door 20 fully rotates, the main link 42, the first sub link 43, the second sub link 44, and the door bracket 45 can rotate so that the end of the door 20 rotates so as not to interfere with the furniture or the wall O. That is, a distance between the end of the door 20 and a front surface of the furniture or the wall O can be spaced a set interval W3 from each other. For example, the set interval W3 can be within about 9 mm.

As described above, when the door 20 rotates, the door 20 can rotate by the hinge 40, and in particular, the door can rotate along the corner of the furniture or the wall O while maintaining the set interval W3 so as not to interfere with the corner of furniture or the wall O. Here, if the door 20 and the furniture or the wall O are too far from other, an interference can occur between the adjacent doors 20, and also, the user's finger or body can be caught between the door 20 and the furniture or wall O. Thus, the interval between the door 20 and the furniture or the wall O can be maintained to a set interval of about 3 mm to about 6 mm. For this, the hinge 40 is configured in a combination of the plurality of coupled link structures, the spring 47, and the linear damper 46 so that the door 20 rotates along a set trajectory while being maintained at a set interval from the adjacent door 20 and the furniture or the wall O so as to open and close the upper storage space 12.

In an embodiment, the operation of the door 20, which is disposed at one side, of the pair of doors 20 will be described as a reference, but the hinges 40 having the same structure can be mounted on all of the pair of doors 20 disposed on both sides. Here, the operation thereof can also be performed in the same manner.

The guide device 90 for guiding the electric wire 701 and the water pipe 801, which are disposed at a side of the cabinet 10, to the inside of the door 20 can be mounted on an upper end of the door 20, on which the hinge 40 is mounted, and a top surface of the cabinet 10. The guide device 90 can prevents the hinge 40, which operates when the door 20 is opened and closed, from interfering with the electric wire 701 and the water pipe 801, and thus, the electric wire 701 and the water pipe 801 can be disposed so as not to be damaged.

Hereinafter, the guide device 90 will be described in more detail with reference to the drawings.

Figure 9:
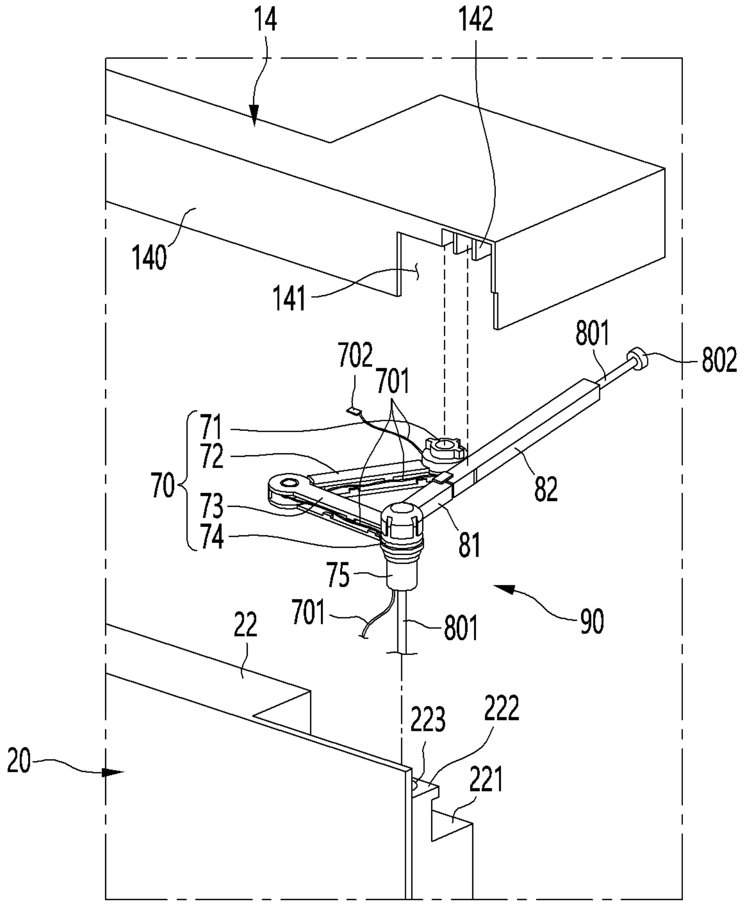
FIG. 9 is an exploded perspective view illustrating an example of a coupling structure of the door, an example guide device, and an example hinge cover.
Figure 10:
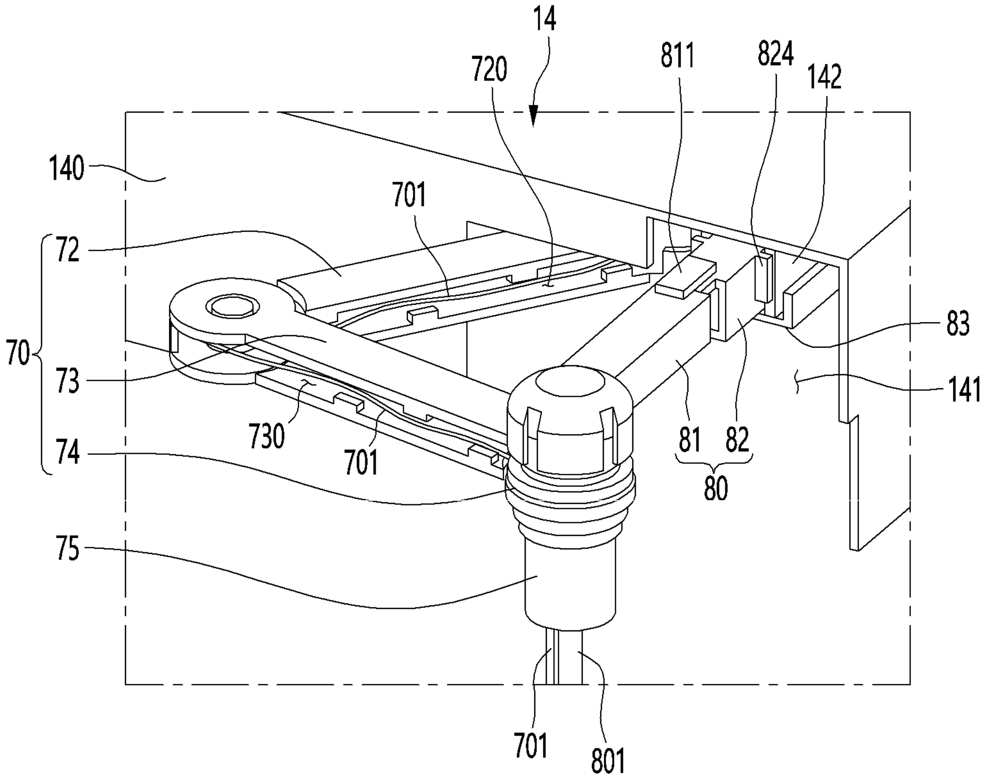
FIG. 10 is a perspective view illustrating the guide device mounted on the hinge cover.
Figure 11:
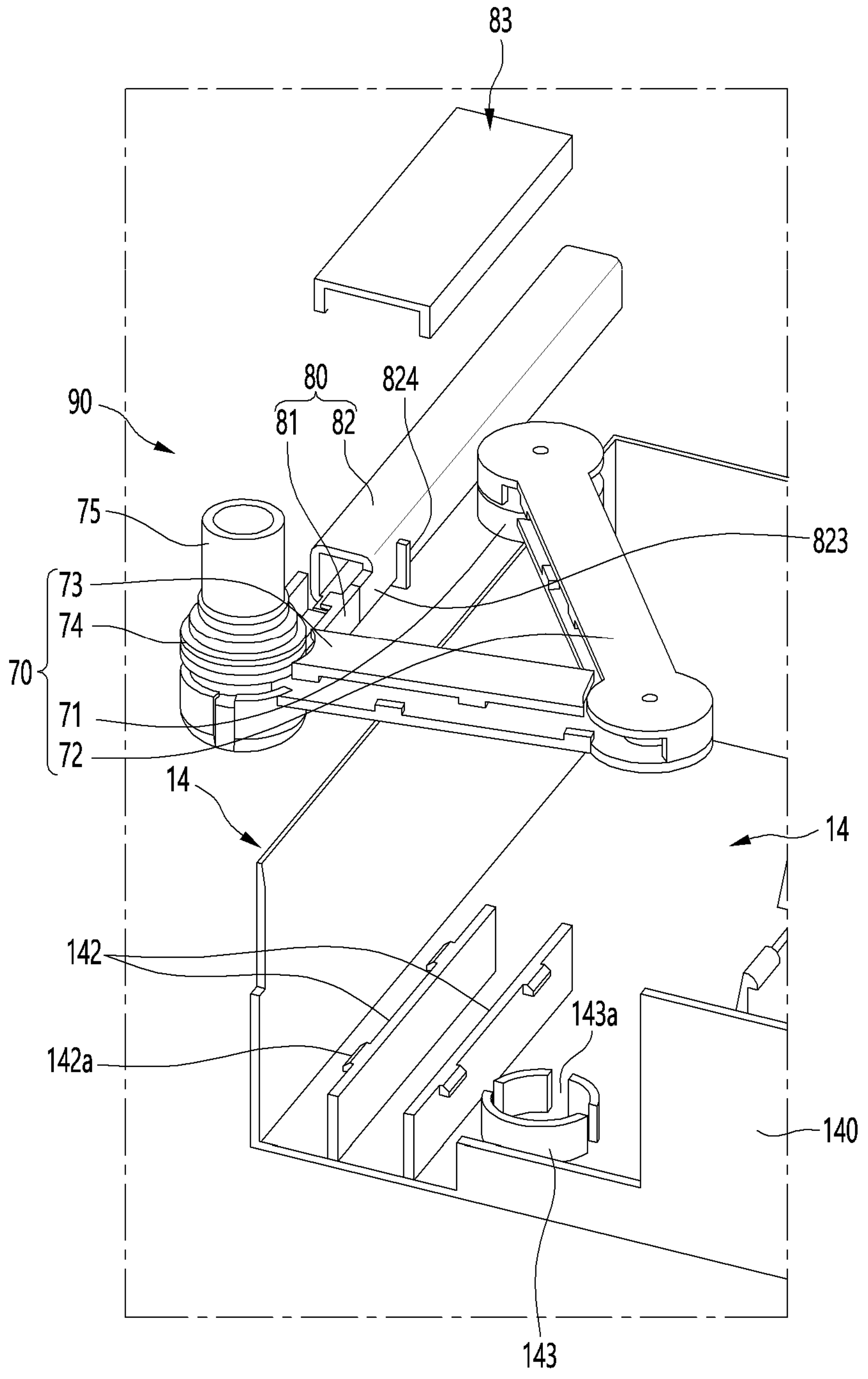
FIG. 11 is an exploded perspective view illustrating an example of a coupling structure of the hinge cover and the guide device.
Figure 12:
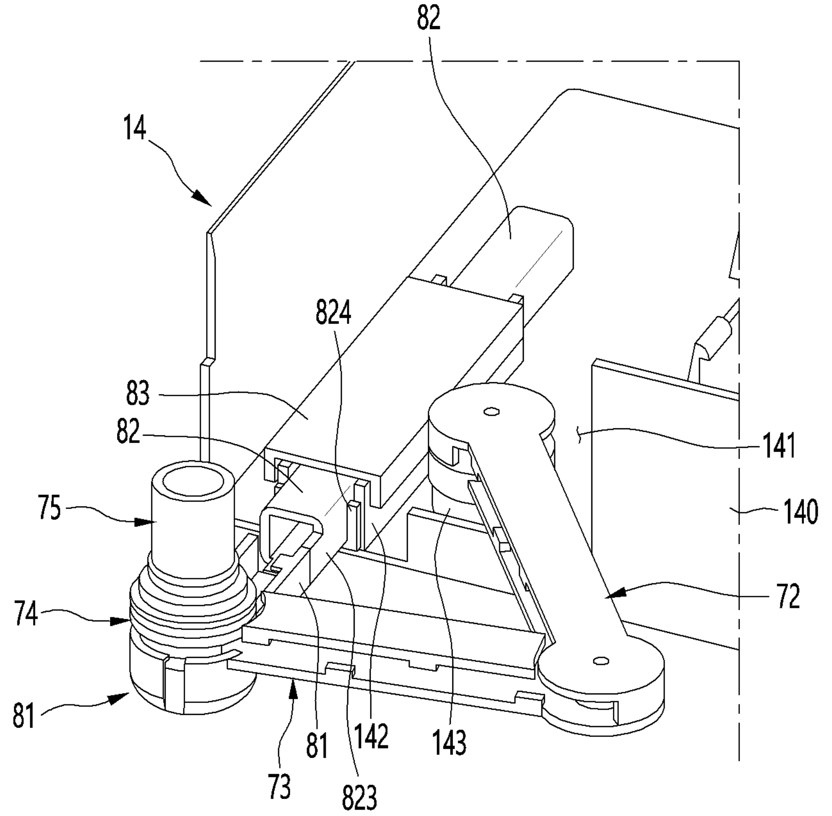
FIG. 12 is a perspective view illustrating the guide device mounted on the hinge cover when viewed from below.

FIG. 9 is an exploded perspective view illustrating an example of a coupling structure of the door, the guide device, and the hinge cover. FIG. 10 is a perspective view illustrating an example state in which the guide device is mounted on the hinge cover. FIG. 11 is an exploded perspective view illustrating an example coupling structure of the hinge cover and the guide device. FIG. 12 is a perspective view illustrating an example state in which the guide device is mounted on the hinge cover when viewed from below.

As illustrated in the drawings, the guide device 90 can connect the cabinet 10 to the door 20 to guide the electric wire 701 and the water pipe 801, which are disposed in the cabinet 10, to the door 20. In some examples, even in a structure in which the door 20 rotates around a plurality of axes by the hinge 40 so as to be opened, the electric wire 701 and the water pipe 801 can be guided to the door 20 without interfering with the hinge 40 and being exposed to the outside.

The guide device 90 can include an electric wire guide 70 guiding the electric wire 701 and a pipe guide 80 guiding the water pipe 801. In some examples, the guide device 90 can be configured as the electric wire guide 70 when only the electric wire 701 is inserted into the door 20. In addition, the guide device 90 can be configured as the pipe guide 80 when only the water pipe 801 is inserted into the door 20.

In detail, the electric wire guide 70 can include a plurality of guide links 72 and 73 that are rotatably connected to each other. For example, the guide links 72 and 73 can include a first guide link 72 and a second guide link 73, and the electric wire 701 can be disposed along the inside of the first guide link 72 and the second guide link 73.

In addition, a cover-side rotation body 71 can be provided at one end of the first guide link 72 so that the electric wire guide 70 is rotatably coupled to the inside of the hinge cover 14. In addition, one end of the second guide link 73 can be rotatably coupled to the guide bush 75 mounted in the door hole 223.

Thus, the first guide link 72 and the second guide link 73 can be folded or unfolded while rotating together with each other during the opening and closing operation of the door 20. In addition, the first guide link 72 can rotated at the hinge cover 14, and the second guide link 73 can rotate at the door 20.

In addition, the electric wire guide 70 can further include a retainer 74 fitted between the guide bush 75 fixed to the door 20 and the second guide link 73. Thus, the electric wire guide 70 can be maintained in a state of being rotatably connected to the guide bush 75.

The plurality of guide links 72 and 73 constituting the electric wire guide 70 can have electric wire accommodation spaces 720 and 730 in which the electric wire 701 is accommodated. In some examples, the electric wire 701 can be guided along the inside of the guide links 72 and 73 and can be folded or unfolded together when the guide links 72 and 73 are folded or unfolded. Thus, the electric wire 701 can have a flexible structure that is not damaged even if the electric wire 701 is folded several times. In some examples, the electric wire 701 can be introduced into the electric wire guide 70 through the cover-side rotation body 71. In addition, the electric wire 701, which is guided to sequentially pass through the first guide link 72 and the second guide link 73, can pass through the guide links 72 and 73 and the guide bush 75 and then be guided to the door 20.

A connector 702 can be disposed on one end of the electric wire 701 exposed through the cover-side rotation body 71. In some examples, a connector having a structure corresponding to the electric wire disposed on the hinge cover 14 can be disposed so that the electric wire 701 is easily connected by coupling between the connectors 702 inside the hinge cover 14.

The pipe guide 80 can be provided in a tubular shape through which the water pipe 801 is capable of passing. The water pipe 801 can have a diameter greater than that of the electric wire 701 and thus may not have a foldable structure to realize a smooth water flow. Thus, the water pipe 801 can have an arrangement structure in which the water pipe 801 is disposed on the pipe guide 80, which moves forward and backward, to secure the smooth water supply toward the door 20.

In some examples, the pipe guide 80 can include a slide guide 82 and a rotation guide 81, which are continuously arranged in a straight line. The slide guide 82 can have a cylindrical shape with front and rear surfaces opened and can be provided to linearly move in a front and rear direction the inside of the hinge cover 14. The water pipe 801 inserted through the opened rear surface of the slide guide 82 is introduced into the rotation guide by passing through the opened front surface of the slide guide 82.

The rotation guide 81 can be rotatably connected to a front end of the slide guide 82 and can move forward and backward together with the slide guide 82. In some examples, the rotation guide 81 can be connected to be rotatable at an end of the slide guide 82. The water pipe 801 inside the rotation guide 81 can be slightly bent according to the rotation of the rotation guide 81, and for this purpose, the water pipe 801 can be made of a flexible material. In some examples, the pipe guide 80 can rotate only by a predetermined angle so that the slide guide 82 moves forward and backward according to the rotation of the door 20, and the water pipe 801 can be bent, but not be folded to secure the water supply performance.

In some examples, a fitting 802 can be provided at one end of the water pipe 801 exposed through the pipe guide. In some examples, the water pipe 801 disposed on the hinge cover 14 can be configured to be inserted into the fitting 802 so that the water pipe 801 is easily connected by the fitting inside of the hinge cover 14.

The rotation guide 81 can be configured so that the slide guide 82 and the guide bush 75 communicate with each other. In addition, the rotation guide 81 can be coupled to shield the opened top surface of the guide bush 75 and can be rotatably coupled to the guide bush 75. Thus, the water pipe 801 guided through the pipe guide 80 can be guided into the door 20 through the guide bush 75.

When the guide device 90 is disposed together with the electric wire guide 70 and the pipe guide 80, the rotation guide 81 can be rotatably connected to the end of the second guide link 73 of the electric wire guide 70. Therefore, the water pipe 801 guided through the pipe guide 80 can pass through the second guide link 73 and then be guided to the inside of the door 20 through the guide bush 75 together with the electric wire 701.

The electric wire 701 and the water pipe 801, which are guided through the guide device 90, can be connected by the connector 702 and the fitting 802 inside the hinge cover 14. In some examples, the guide device 90 can be partially inserted into the hinge cover 14 through the cover opening 141 of the hinge cover 14 and be mounted rotatably and slidably.

In detail, a cover opening 141 can be defined in the front surface of the hinge cover 14. The cover opening 141 can be provided to a size at which the vertical portion 482 of the mounting bracket 48 is exposed, and simultaneously, the cover opening 141 can be provided to a size at which the guide device 90 passes therethrough.

The vertical portion 482 can be disposed below the cover opening 141, and the guide device 90 can be disposed above the cover opening 141. That is, the hinge 40 can be disposed in a lower area of the cover opening 141, and the guide device 90 can be disposed in an upper area of the cover opening 141. In addition, the guide device 90 can be disposed above the hinge 40 and be mounted on an inner top surface of the hinge cover 14 so as not to interfere with the hinge 40 during the opening and closing operation of the door 20.

A rotation mounting portion 143 to which an end of the electric wire guide 70 is rotatably mounted can be disposed inside the hinge cover 14. The rotation mounting portion 143 can be disposed at a rear side of the cover opening 141 and be disposed on the inner top surface of the hinge cover 14.

The rotation mounting portion 143 can be provided so that the cover-side rotation body 71 of the electric wire guide 70 is inserted. In addition, the rotation mounting portion 143 can be fixedly mounted to the cover-side rotation body 71. In addition, the cover-side rotation body 71 can be rotatably coupled to the first guide link 72, and as a result, one end of the guide device 90 can be rotatable with respect to the rotation mounting portion 143 of the hinge cover 14.

In addition, the first guide link 72 can be disposed to extend in a direction away from the slide guide 82 as the first guide link 72 faces the door 20 and can be rotatable according to the opening and closing of the door 20.

In some examples, one end of the second guide link 73 can be rotatably connected to an extending end of the first guide link 72, and the other end can be rotatably connected to the guide bush 75. Thus, when the door 20 rotates, the second guide link 73 can rotate together with the first guide link 72 and be folded or unfolded with the first guide link 72.

A slide accommodation portion 142 can be disposed inside the hinge cover 14 so that the pipe guide 80 is slidably mounted in the front and rear direction. The slide accommodation portion 142 can define a space in which the pipe guide 80 is inserted and have a structure in which the pipe guide 80 moves in the front and rear direction.

The slide accommodation portion 142 can be defined by a pair of ribs protruding downward from the inner top surface of the hinge cover 14. In addition, the slide accommodation portion 142 can extend backward from the cover opening 141. In this case, the extending direction of the slide accommodation portion 142 can be a direction perpendicular to the front surface of the hinge cover 14.

In addition, the slide accommodation portion 142 can be provided further outward than the rotation mounting portion 143. In addition, when the door 20 is closed, the door hole 223 and the slide accommodation portion 142 can be configured to be disposed on the same extension line in the front and rear direction.

A slide guide 82 of the pipe guide 80 can be mounted inside the slide accommodation portion 142. Therefore, a distance between the pair of slide accommodation portions 142 can be equal to or somewhat larger than a width of the slide guide 82. In addition, a length of the slide accommodating portion 142 in the front and rear direction can be less than a length of the slide guide 82 in the front and rear direction, and front and rear surfaces of the slide accommodating portion 142 can be opened. Thus, front and rear ends of the slide guide 82 can protrude forward and backward while being mounted on the inside of the slide accommodation portion 142.

In some examples, a slide cover 83 can be mounted on a lower end of the slide accommodation portion 142. The slide cover 83 can shield the opened bottom surface of the slide accommodation portion 142, and the state in which the slide guide 82 is mounted inside the slide accommodation portion 142 can be maintained.

With this structure, the guide device 90 can be mounted on the hinge cover 14. In addition, the electric wire guide 70 can rotate inside the hinge cover 14, and the pipe guide 80 can be slid in the front and rear direction from the inside of the hinge cover 14. Therefore, when the door 20 rotates, the electric wire guide 70 and the pipe guide 80 can rotate and be slid, and the electric wire 701 and the water pipe 801 can be guided to the door 20.

Hereinafter, an internal structure of the guide device 90 will be described in more detail with reference to the drawings.

Figure 13:
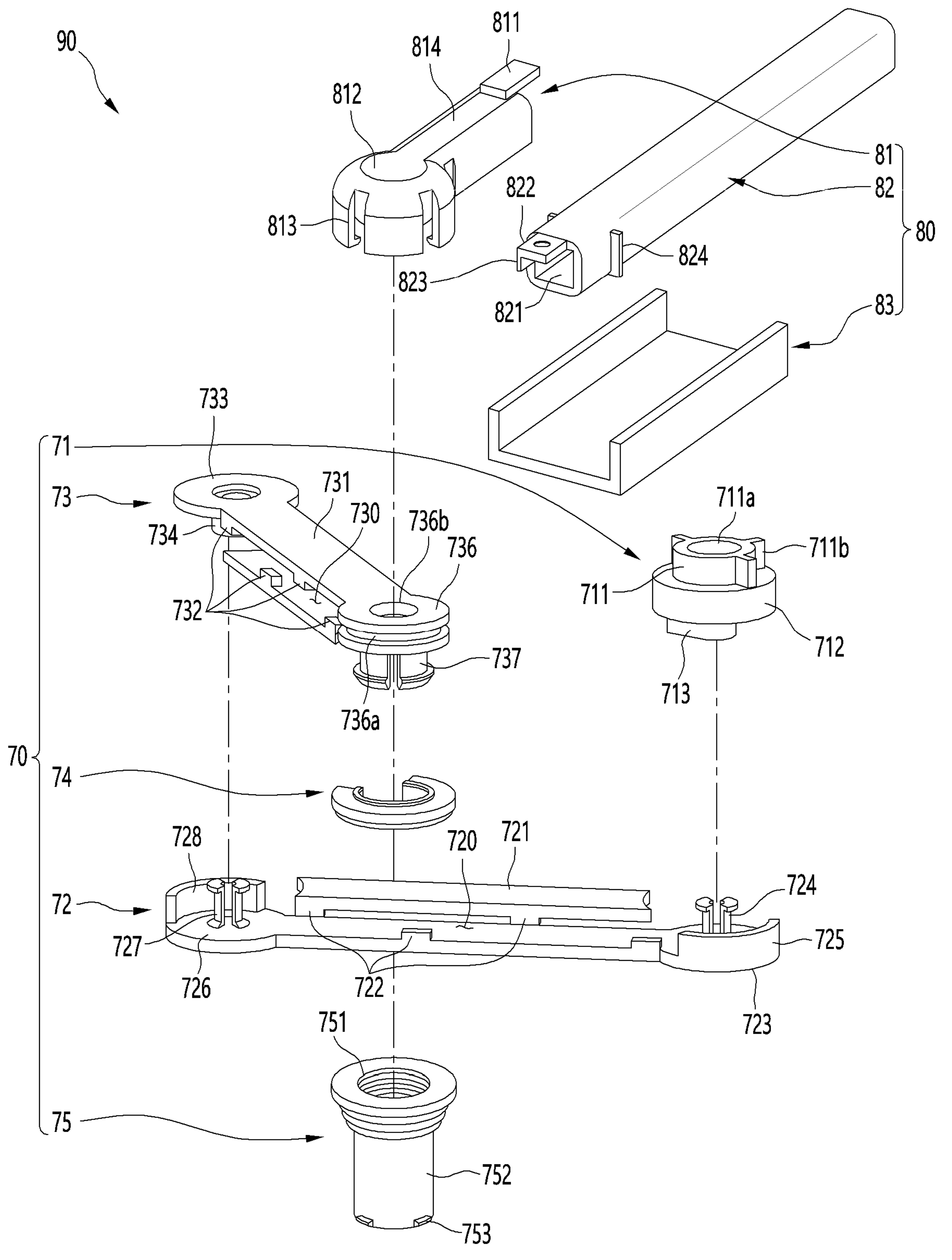
FIG. 13 is an exploded perspective view illustrating the guide device.
Figure 14:
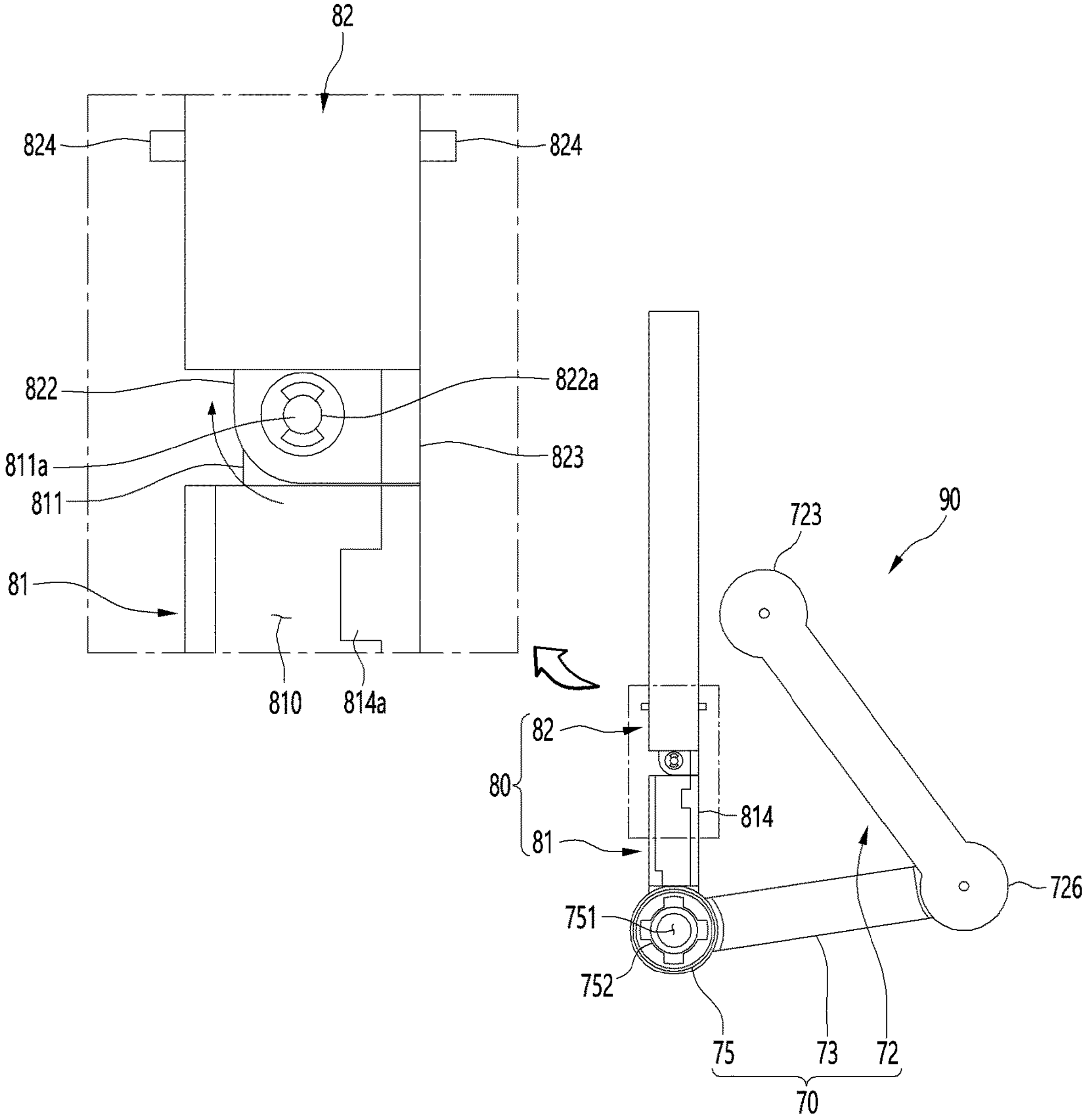
FIG. 14 is a bottom view illustrating an example assembly of the guide device.
Figure 15:
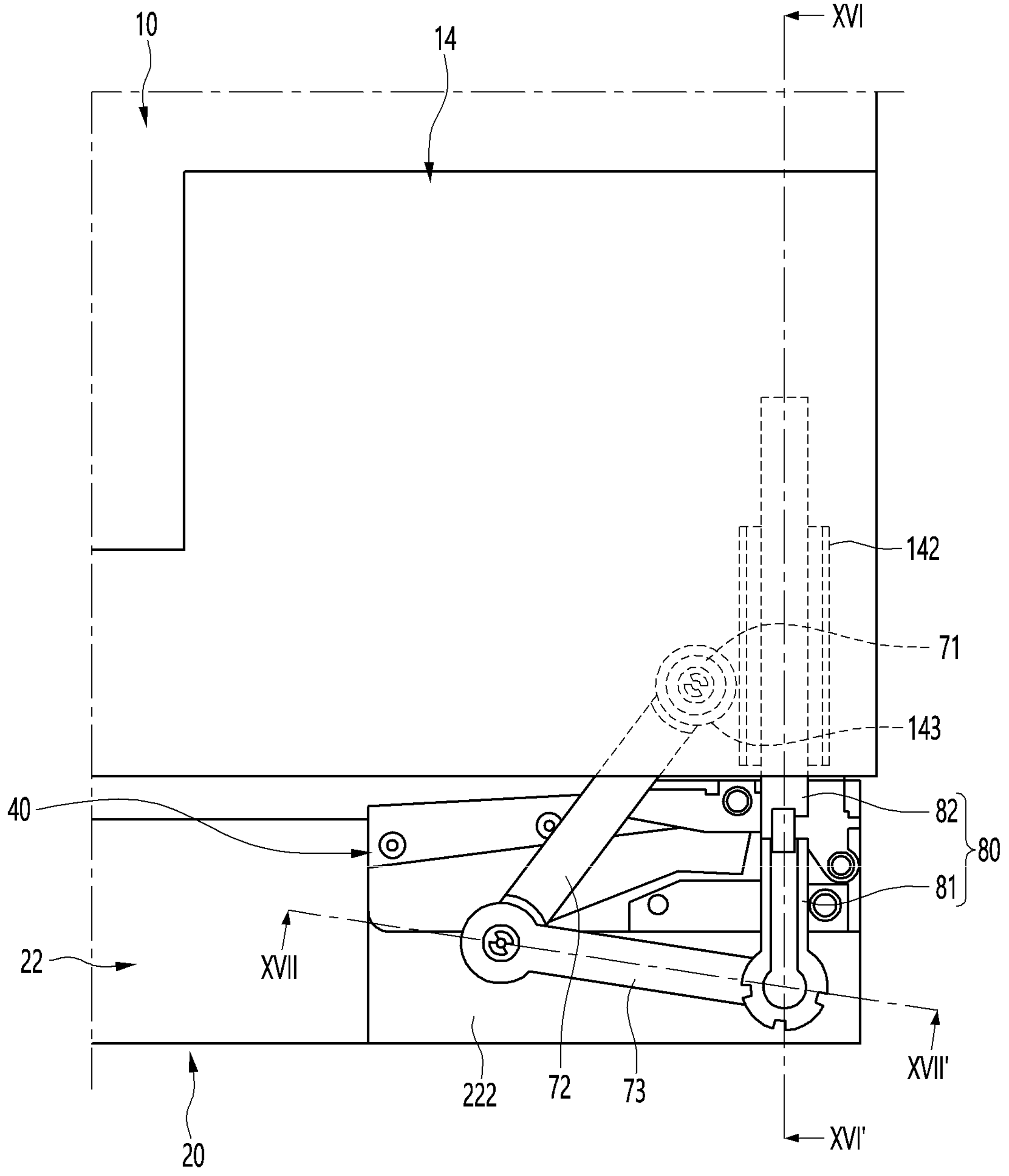
FIG. 15 is a plan view illustrating an example state of the guide device mounted to the refrigerator.
Figure 16:
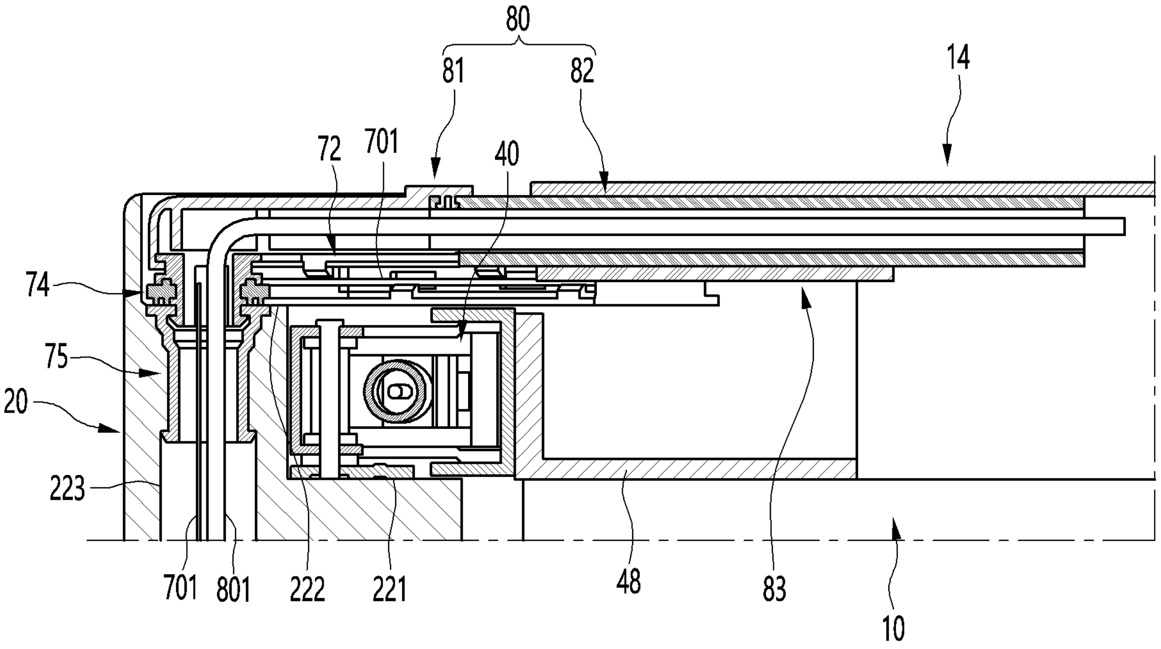
FIG. 16 is a cross-sectional view taken along line XVI-XVI' of FIG. 15.
Figure 17:
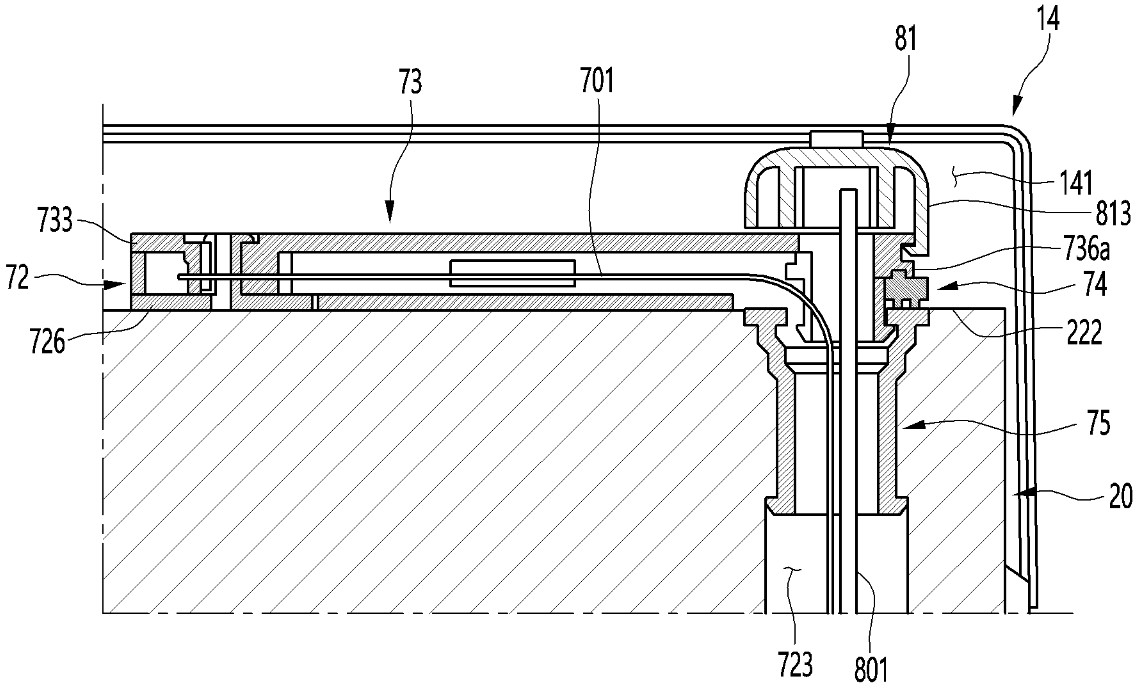
FIG. 17 is a cross-sectional view taken along line XVII-XVII' of FIG. 15.

FIG. 13 is an exploded perspective view illustrating the guide device. FIG. 14 is a bottom view illustrating an example state in which the guide device is assembled. FIG. 15 is a plan view illustrating an example state in which the guide device is mounted. FIG. 16 is a cross-sectional view taken along line XVI-XVI' of FIG. 15. FIG. 17 is a cross-sectional view taken along line XVII-XVII' of FIG. 15.

As illustrated in the drawings, the guide device 90 can be connected to the electric wire guide 70 and the pipe guide 80 and can rotate and be slid by being interlocked with the opening and closing operation of the door 20.

The electric wire guide 70 can be configured by connecting a plurality of guide links 72 and 83 to each other. For example, the electric wire guide 70 can include a first guide link 72 and a second guide link 73.

The first guide link 72 can include a first link body 721 extending in a straight line and a first coupling portion 723 and a first connection portion 726, which are disposed at both ends of the first link body 721.

The first link body 721 can have an electric wire accommodation portion 720 in which the electric wire 701 is accommodated. In addition, the electric wire accommodation portion 720 can be opened toward the first coupling portion 723 and the first connection portion 726 so that the electric wire 701 sequentially passes through the first coupling portion 723, the electric wire accommodation portion 720, and the first connection portion 726 and then is guided to face the second guide link 73.

In some examples, the electric wire accommodation portion 720 can be opened along one side surface of the first link body 721, and the electric wire 701 can be inserted through the opened side surface of the first link body 721. In some examples, a plurality of separation prevention protrusions 722 can be disposed on the opened side surface of the electric wire accommodation portion 720. The plurality of separation prevention protrusions 722 can be spaced apart from each other along the opened side surface of the electric wire accommodation portion 720 and can be disposed so as to be alternately disposed at top and bottom ends thereof, which face each other. Thus, the electric wire 701 can be separated or mounted through the opening of the electric wire accommodation portion 720.

The first coupling portion 723 can protrude laterally from one end of the first link body 721, and a first coupling shaft 724 can protrude upward. In addition, the cover-side rotation body 71 can be coupled to the first coupling shaft 724. Thus, the first guide link 72 can rotate around the first coupling shaft 724, i.e., the cover-side rotation body 71.

In some examples, a first coupling portion rib 725 can be disposed around the first coupling portion 723. The first coupling portion rib 725 can be disposed on a portion of a circumference of the first coupling portion 723, and when the first guide link 72 rotates, the first coupling portion rib 725 can interfere with the cover-side rotation body 71 to limit a rotating angle.

The cover-side rotation body 71 can be rotatably coupled to the first coupling portion 723 and can include an insertion portion 711 inserted into the rotation mounting portion 143 of the hinge cover 14 and a seat 712 seated on an end of the rotation mounting portion 143.

The insertion portion 711 can be provided in a corresponding cylindrical shape so as to be inserted into the rotation mounting portion 143, and an opening 711*a* can be defined in a center of the insertion portion 711. In some examples, a plurality of hook protrusions 711*b* can be disposed in a mounting portion groove 143*a* of the rotation mounting portion 143 around the insertion portion 711 and can be hooked with the rotation mounting portion 143 to restrict the insertion portion 711 so as not to rotate in a state in which the insertion portion 711 is inserted into the rotation mounting portion 143.

In some examples, the seat 712 can protrude outward from a lower end of the insertion portion 711 and be seated on a lower end of the rotation mounting portion 143. A top surface of the seat 712 can be in contact with a bottom surface of the rotation mounting portion 143, and a bottom surface of the seat 712 can be in contact with an upper end of the first coupling portion rib 725. Thus, the rotation mounting portion 143 and the first guide link 72 can be maintained at a predetermined interval therebetween.

The rotation body protrusion 713 can protrude downward from the bottom surface of the seat 712. The rotation body protrusion 713 can be disposed in a partial section along a circumference of the seat 712 and can be hooked with the first coupling portion rib 725 when the first guide link 72 rotates to restrict the first guide link 72 so as not to rotate more than a set angle.

The first connection portion 726 can protrude laterally from the other side end of the first link body 721, and the first connection shaft 727 can protrude upward. In addition, the first connection shaft 727 can be coupled to the second connection portion 733 of the second guide link 73. Thus, the first guide link 72 and the second guide link 73 can be rotatably connected to each other.

A first connection portion rib 728 can be further disposed around the first connection portion 726. The first connection portion rib 728 can be provided in a direction opposite to the first coupling portion rib 725 and can be disposed only in a partial section along a circumference of the first connection portion 726. The first connection portion rib 728 can limit the rotation of the second guide link 73 by more than the set angle due to the interference with the second guide link 73.

The second guide link 73 can have a shape similar to that of the first guide link 72 as a whole. In addition, the second guide link 73 can include a second link body 731 extending in a straight line and a second coupling portion 736 and a second connection portion 733, which are disposed at both ends of the second link body 731.

The second link body 731 can have the electric wire accommodation portion 730 defined therein. Both ends of the electric wire accommodation portion 730 can be opened toward the second coupling portion 736 and the second connection portion 733. In addition, the electric wire accommodation portion 730 can be opened along one side of the second link body 731, and a plurality of separation prevention protrusions 732 can be provided on opened upper and lower ends of the electric wire accommodation portion 730. In addition, an opened side surface of the second link body 731 can be a surface opposite to a surface facing the second link body 731.

The second connection portion 733 can be disposed on one end of the second link body 731 and can be provided in a shape corresponding to that of the first connection portion 726. In some examples, a second connection boss 734 protruding downward can be disposed at a center of the second connection portion 733 so that the first connection shaft 727 is inserted and connected. Thus, the first connection portion 726 and the second connection portion 733 can be rotatably coupled to each other. In addition, the electric wire 701 passing through the first link body 721 can be bent along an outer surface of the second connection boss 734 and then be disposed inside the second link body 731.

The second coupling portion 736 can be disposed on the other end of the second link body 731 and be coupled to the guide bush 75. A second coupling shaft 237 protruding downward can be disposed on a bottom surface of the second coupling portion 736. The second coupling shaft 237 can be configured so that a plurality of hook shapes are arranged in a cylindrical shape and be provided to be inserted through the bush hole 751 in a top surface of the guide bush 75. In some examples, an end of the second coupling shaft 237 can be hooked with an inner surface of the bush hole 751, and the second link body 731 can be rotatably coupled to the second coupling shaft 237.

A retainer 74 can be mounted between the second coupling portion 736 and the guide bush 75. The retainer 74 can be provided in a ring shape, and the second coupling shaft 237 can be disposed to pass through the retainer 74. Therefore, the retainer 74 can allow an upper end of each of the second coupling portion 736 and the guide bush 75 to be maintained at a set interval therebetween, thereby enabling the smooth rotation of the first guide links 72 and 73.

In some examples, a coupling groove 736*a* can be defined in a circumferential surface of the second coupling portion 736. The coupling groove 736*a* can be a groove to which the guide hook 813 of the pipe guide 80 is coupled and can be recessed along the second coupling portion 736.

The electric wire 701 inside the second link body 731 can pass through a space between the second coupling portion 736 and the second coupling shaft 237 and then be introduced into the bush hole 751 in the top surface of the guide bush 75. In some examples, a coupling portion opening 736*b* communicating with the inside of the second coupling shaft 237 can be defined in a center of the second coupling portion 736. In addition, the coupling portion opening 736*b* can be defined to be greater than a diameter of the water pipe 801 so that the water pipe 801 passes.

Thus, the electric wire and the water pipe 801 can be introduced into the guide bush 75 through the second coupling portion 736 and can be guided to the inside of the door 20.

The guide bush 75 can include a cylindrical bush body 752 that can be inserted into the door hole 223. In addition, the bush hole 751 can be defined to be penetrated at a center of the bush body 752. A bush hook 753 protruding outward can be disposed on a lower end of the bush body 752 and can be hooked inside the door 20 so that the guide bush 75 is maintained in a state of being firmly fixed to the door 20.

The pipe guide 80 can be constituted by a rotation guide 81 and a slide guide 82, which are disposed in the front and rear sides in the straight line.

The slide guide 82 can be provided in a tubular shape having a hollow therein and can be provided to allow the water pipe 801 to pass therethrough. An opened front end of the slide guide 82 can protrude through the cover opening 141 of the hinge cover 14, and an opened rear end of the slide guide 82 can protrude to a rear side of the slide accommodation portion 142.

Here, a length of the slide guide 82 can be provided to a length at which the rear end of the slide guide 82 is disposed inside the slide accommodation portion 142 when the door is maximally opened, and the slide guide 82 is withdrawn, thereby preventing the slide guide 82 from being separated when the pipe guide 80 is drawn in and out.

In some examples, a slide protrusion 824 protruding laterally can be disposed on each of both side surfaces of a front portion of the slide guide 82. The slide protrusion 824 can be in contact with a front end of the slide accommodation portion 142 when the slide guide 82 is maximally inserted to restrict the backward movement of the slide guide 82.

In some examples, a rotation restriction portion 823 that further protrudes forward can be disposed on one end of an opened front surface of the slide guide 82. The rotation restriction portion 823 can be in contact with a rear end of the rotation guide 81 in a state in which the door 20 is completely closed to limit the rotation of the rotation guide 81 so that the rotation guide 81 may not further rotate. In the state in which the rotation restriction portion 823 and the rotation guide 81 are in contact with each other, the slide guide 82 and the rotation guide 81 can be disposed in a straight line.

In addition, a slide coupling portion 822 protruding forward can protrude from an upper end of the opened front surface of the slide guide 82. A coupling hole 822*a* axially coupled to the rotation guide can be defined in the slide coupling portion 822. The slide coupling portion 822 and the rotation restriction portion 823 can protrude by the same distance and can be continuously connected to each other to support a rear end of the rotation guide 81 together.

The rotation guide 81 can be connected to a front end of the slide guide 82. The rotation guide 81 can include a rotation body 814 and a rotation connection portion 812.

The rotation body 814 can extend in the same extension line as the slide guide 82 and can define a passage through which the water pipe 801 passes. The rotation body 814 can be opened downward, and a separation prevention protrusion 814*a* that protrudes inward to prevent the water pipe 801 from being separated through the opened bottom surface can be disposed on the opened bottom surface of the rotation body 814.

In some examples, a rotation coupling portion 811 protruding backward can be disposed on a rear end of the rotation body 814. The rotation coupling portion 811 can extend backward to overlap the slide coupling portion 822. In some examples, a rotation shaft 811*a* protruding downward can be disposed on the rotation coupling portion 811, and the rotation shaft 811*a* can be inserted through the coupling hole 822*a*. Thus, the slide guide 82 and the rotation guide 81 can be connected to each other, and the rotation guide 81 can rotate about the rotation shaft 811*a*.

The rotation connection portion 812 can be disposed on the extending end of the rotation body 814 and be rotatably connected to the door 20. The rotation connection portion 812 can be disposed above the second coupling portion 736 of the electric wire guide 70.

A guide hook 813 extending downward can be disposed around the rotation connection portion 812. The guide hook 813 can be hooked and restricted in the coupling groove 736*a* of the second coupling portion 736. In addition, the guide hook 813 can rotate along the coupling groove 736*a*. Thus, the pipe guide 80 can be rotatably connected to the electric wire guide 70.

In addition, the rotation connection portion 812 can communicate with the coupling portion opening 736*b* and the bush hole 751. Therefore, the water pipe 801 guided through the rotation body 814 can be bent downward from the rotation connection portion 812 and sequentially pass through the coupling portion opening 736*b* and the bush hole 751 so as to be guided to the inside of the door 20.

Hereinafter, a state of the guide device 90 when the door 20 of the refrigerator 1 having the above structure is opened and closed will be described with reference to the drawings.

Figure 18:
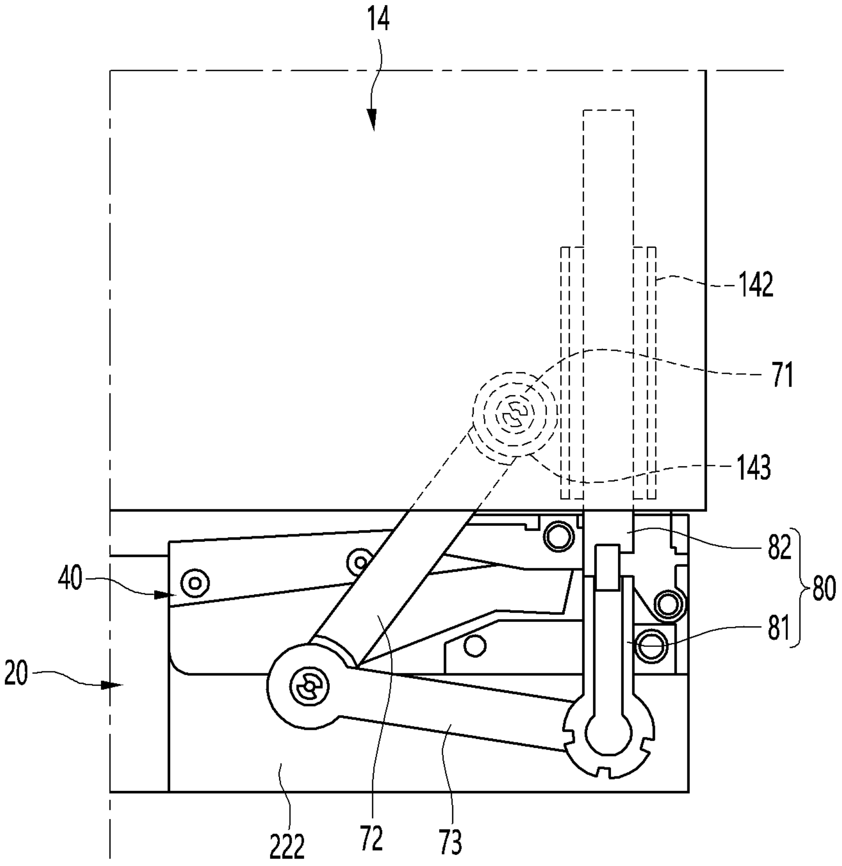
FIG. 18 is a view illustrating example states of the upper hinge and the guide device in a state in which the door is closed.
Figure 19:
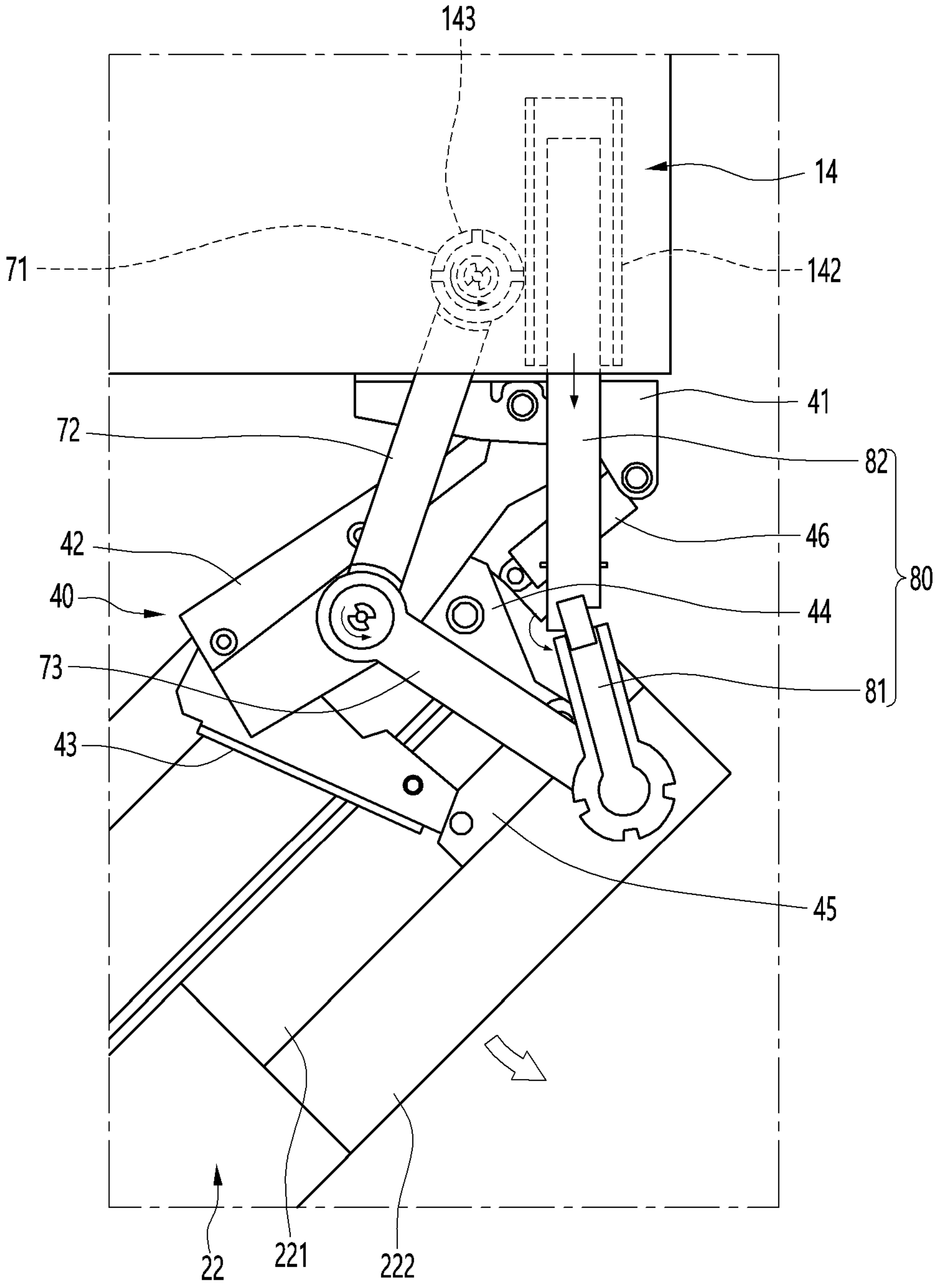
FIG. 19 is a view illustrating example states of the upper hinge and the guide device in a state in which the door is further opened compared to the state illustrated in FIG. 18.
Figure 20:
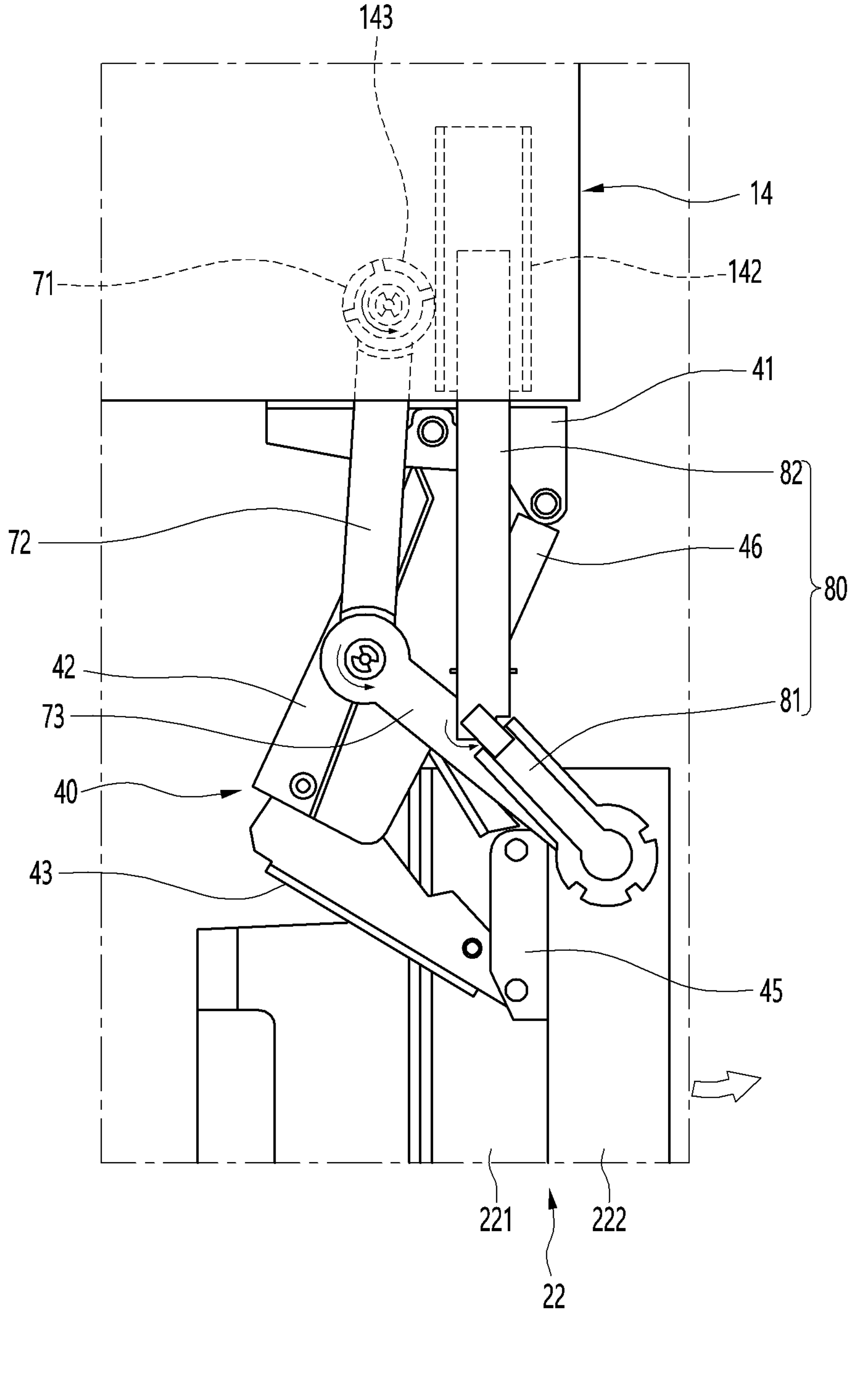
FIG. 20 is a view illustrating example states of the upper hinge and the guide device in a state in which the door is further opened compared to the state illustrated in FIG. 19.
Figure 21:
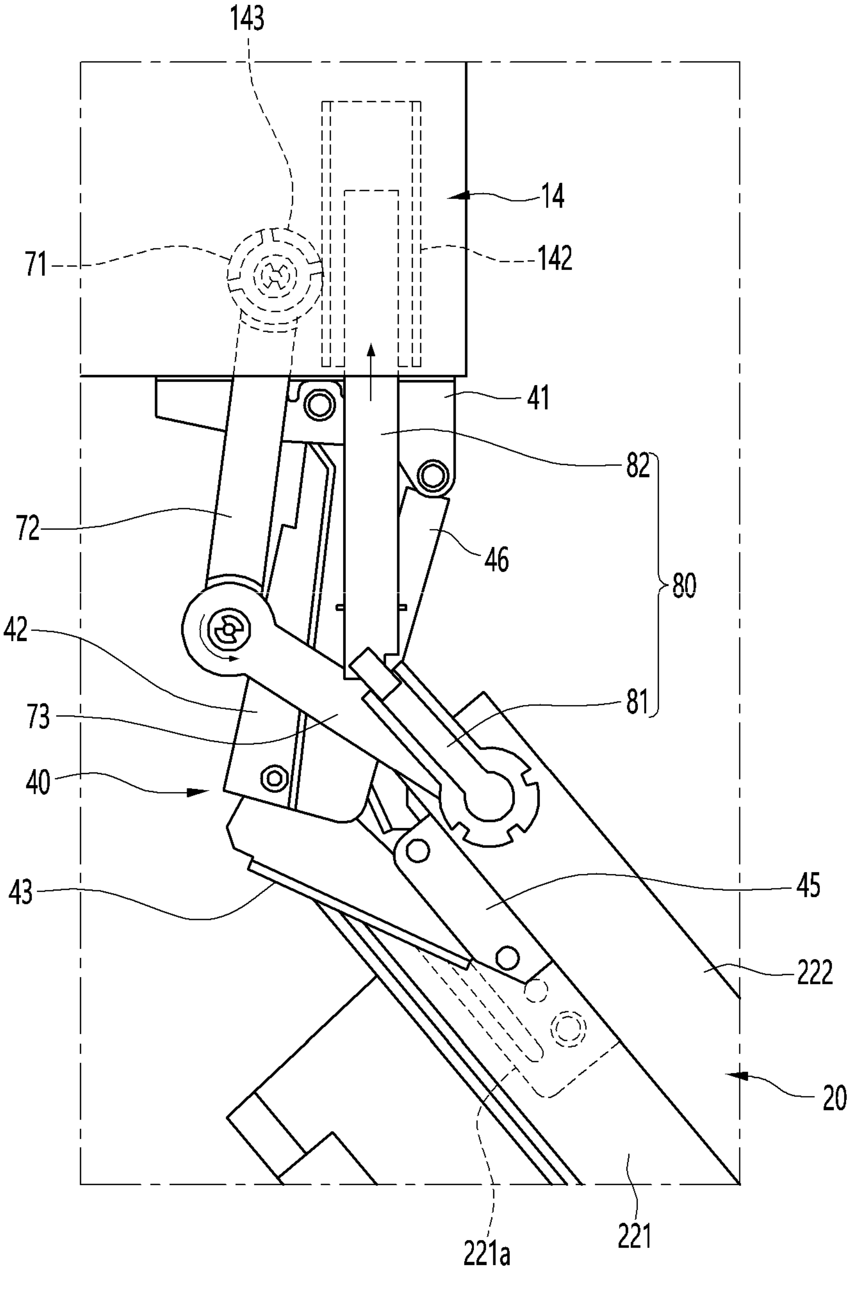
FIG. 21 is a view illustrating example states of the upper hinge and the guide device in the state in which the door is fully opened.

FIG. 18 is a view illustrating example states of the upper hinge and the guide device in a state in which the door is closed. FIG. 19 is a view illustrating example states of the upper hinge and the guide device in a state in which the door is further opened compared to the state illustrated in FIG. 18. FIG. 20 is a view illustrating example states of the upper hinge and the guide device in a state in which the door is further opened compared to the state illustrated in FIG. 19. FIG. 21 is a view illustrating example states of the upper hinge and the guide device in the state in which the door is fully opened.

As illustrated in the drawings, when the door 20 is closed, as illustrated in FIG. 18, the hinge 40 can be fully folded and accommodated inside the hinge mounting portion 221.

In this state, the electric wire guide 70 is maximally folded. In the state in which the electric wire guide 70 is maximally folded, each of the first guide link 72 and the second guide link 73 can be at an angle between about 30° to about 60°.

In addition, the pipe guide 80 can be inserted into the hinge cover 14 as far as possible. The slide guide 82 and the rotation guide 81 can be aligned in the straight line, and the front end of the slide guide 82 and the rear end of the rotation guide 81 can be disposed in front of the front surface of the hinge cover 14.

When the user opens the door 20 in this state, the door can be opened according to the operation of the hinge 40 as illustrated in FIGS. 19 to 21. For example, an angle defined by the front surface of the door 20 and the front surface of the cabinet 10 can be about 45° in FIG. 19, about 90° in FIG. 20, and about 130° in FIG. 21.

The hinge 40 can have a structure in which the door 20 rotates simultaneously while the door 20 moves forward as described above in the multi-link structure. Thus, the door 20 can rotate without colliding with the neighboring furniture or wall O.

In detail, the operation of the hinge 40 can be performed according to the user's manipulation of the door 20, and the door 20 can be opened while rotating together according to the rotation trajectory of the hinge 40.

According to the process of opening the door 20, the guide device 90 can also operate to maintain the state in which the electric wire 701 and the water pipe 801 at a side of the cabinet 10 are guided to the door 20 through the guide device 90.

In detail, as illustrated in FIG. 19, when the door 20 is opened at an angle of approximately 45°, the electric wire guide 70 can rotate. That is, each of the first guide link 72 and the second guide link 73 can rotate, and the angle of each of the first guide link 72 and the second guide link 73 can be greater than that in FIG. 18.

In some examples, the pipe guide 80 can be withdrawn forward to correspond to the movement and rotation of the door 20. Here, the slide guide 82 can move forward, and the rotation guide 81 can rotate at the front end of the slide guide 82 to move together with the door 20.

As illustrated in FIG. 20, when the door 20 is further opened, and in the door is opened at an angle of about 90°, the electric wire guide 70 can further rotate. That is, each of the first guide link 72 and the second guide link 73 can rotate, and the angle of each of the first guide link 72 and the second guide link 73 can be greater than that in FIG. 19. As described above, in the state in which the door 20 is opened at an angle of about 90°, the first guide link 72 can rotate to be closer to the slide guide 82, and an angle between the first guide link 72 and the second guide links 73 can be maximum.

In some examples, the pipe guide 80 can be further withdrawn forward to correspond to the movement and rotation of the door 20. Here, the slide guide 82 can further move forward, and the rotation guide 81 can further rotate at the front end of the slide guide 82 to move together with the door 20.

As illustrated in FIG. 21, in the state in which the door 20 is fully opened at an angle of about 130°, the electric wire guide 70 can rotate, but the first guide link 72 may not further rotate, and only the second guide link 73 can further rotate.

That is, since the door 20 rotates in a state in which the forward movement is completed, the first guide link 72 can further rotate according to the rotation of the door 20. Thus, an angle between the first guide link 72 and the second guide link 73 can be less than that in FIG. 20.

In addition, the door 20 can rotates in the state in which the door 20 completely moves forward, and thus, the slide guide 82 can move backward compared to FIG. 20.

As described above, the guide device 90 can rotate and be slid above the hinge 40 during the opening operation of the door 20. The guide device 90 can rotate and be withdrawn to correspond to the movement trajectory of the door 20, thereby guiding the electric wire 701 and the water pipe 801.

In some examples, the guide device 90 can be interlocked with the operation of the hinge 40. However, the guide device 90 can operate at the upper side at which the guide device 90 is completely separated from the hinge 40 so as not to interfere with the hinge 40 and also not affect the operation of the door 20.

After the door 20 is opened, the user can perform an operation to close the door 20, and while the door 20 is closed, the hinge 40 and the guide device 90 can operate in reverse order of the above-described processes.

In addition to the foregoing embodiment, a refrigerator according to various implementations can be exemplified.

Hereinafter, another embodiment will be described in more detail with reference to the drawings.

According to another embodiment, a guide device can be constituted by an electric wire guide and a pipe guide together, or the guide device can be constituted by only an electric wire guide according to a configuration inside a door. In a refrigerator, there is only a difference only in combination of configurations of the guide device. Therefore, the same components are indicated using the same reference numerals, or detailed descriptions or illustrations thereof will be omitted to prevent duplication of description.

Figure 22:
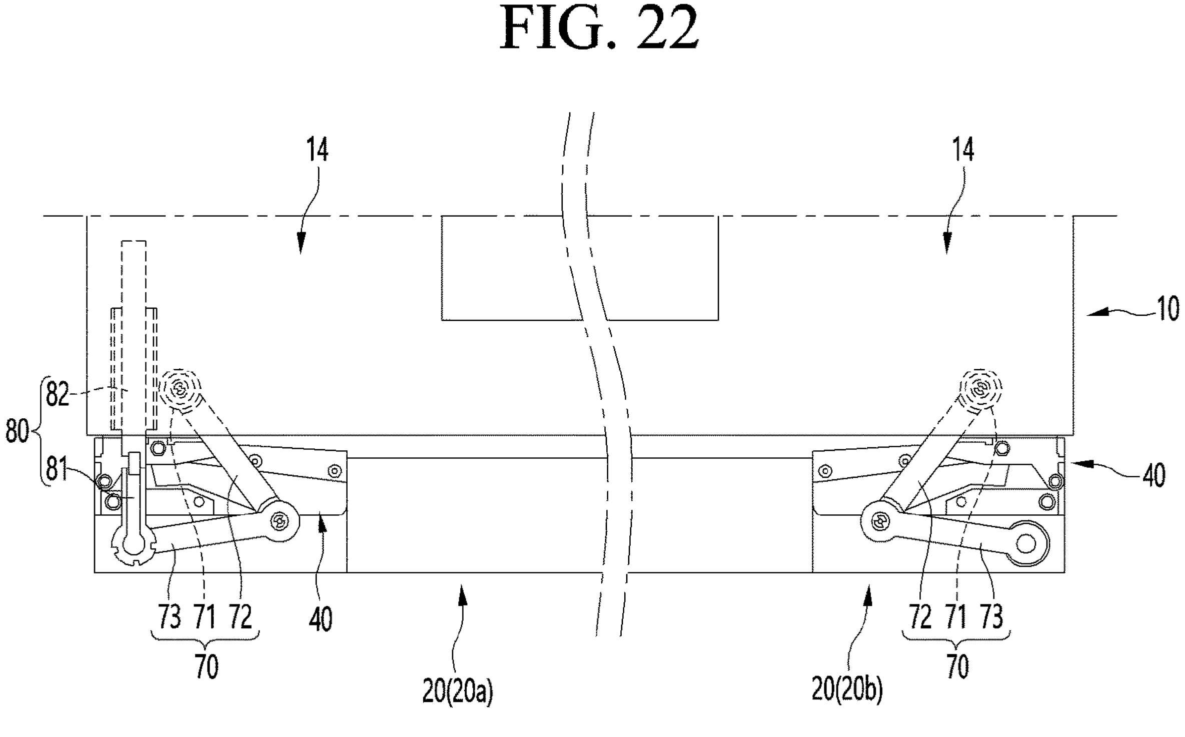
FIG. 22 is a plan view illustrating an example arrangement of the guide device.

FIG. 22 is a plan view illustrating an arrangement of the guide device.

As illustrated in the drawings, when doors 20 are provided on both sides of a refrigerator 1, a configuration of a guide device 90 can be different depending on an internal configuration of the door 20.

For example, the door 20 can be constituted by a left door 20*a* and a right door 20*b*, and a component, to which water is supplied, such as an ice maker 204 or a dispenser 201 as illustrated in FIG. 1 can be provided in the left door 20*a*, and only electrical components such as a door light 242 can be disposed in the right door 20*b*.

That is, a water pipe 801 and an electric wire 701 have to be guided to the left door 20*a*. Thus, the guide device 90 provided in the left door 20*a* can be provided by assembling the electric wire guide 70 and the pipe guide 80 together with each other. The water pipe 801 can include various types of pipes or tubes. For instance, the water pipe 801 can include a flexible tube, a metal pipe, or a rigid plastic pipe or tube.

In some examples, the component to which water is supplied may not be disposed in the right door 20*b*, and only the electrical components can be disposed so that only the electric wire is guided to the door 20. Thus, the guide device 90 provided in the right door 20*b* can be provided as only the electric wire guide 70.

Alternatively, the guide device 90 can be provided as only the electric wire guide 70 according to the configuration of the left door 20*a* and the right door 20*b*.

The following effects can be expected in the refrigerator according to the proposed implementations of the present invention.

In some implementations, the door can rotate about the plurality of axes by the hinge having the multi-link structure and can be opened and closed while moving and rotating forward and backward. In addition, the electric wire and the water pipe can be guided by the guide device for operation of the electrical components disposed inside the door and components for supplying the water, and the guide device can rotate together with the door and move backward and forward to secure the stable guidance of the electric wire and the water pipe.

In some implementations, the guide device can be provided separately from the hinge and be disposed to be spaced apart from the hinge in the upward direction, in which the guide device may not interfere with the hinge. Therefore, when the hinge having the multi-link structure operates, the electric wire and the water pipe can avoid damage by the interference with the hinge.

In some implementations, the electric wire and water pipe can be guided to the inside of the door through the guide device, and thus the electric wire and water pipe may not be exposed to the outside to improve the outer appearance.

In some implementations, the guide device can include the electric wire guide having the structure, in which the plurality of links rotate to be folded, and the pipe guide that moves forward and backward. Therefore, the relatively thin and well-foldable electric wire can be guided by the electric wire guide, and the pipe having the thick diameter and capable of being deteriorated in water supply performance when being excessively bent can be guided by the linearly moving pipe guide. Therefore, there can be the advantage of being able to effectively guide the electric wire and the pipe to the door.

In some implementations, the door can be opened and closed by the multi-link hinge and have the structure that rotates while moving forward and backward. The electric wire and the water pipe can effectively correspond to the rotation trajectory of the door by the rotatable structure of the electric wire and the forward and backward movable structure of the pipe guide and thus can be effectively guided.

In some implementations, there can be the advantage of providing the stable guide structure of the electric wire and the water pipe by the guide device even at the angle at which the door is completely opened so that the storage object or the storage member inside the refrigerator is drawn in and out.

In some implementations, the electric wire guide and the pipe guide can have the ends that communicate with each other, and also, the electric wire and water pipe can be inserted into the door together through the guide bush provided in the door to realize the simple electric wire and water pipe guide structure.

In some cases, the electric wire guide and the pipe guide can be separable from each other and mounted to provide the guide device having the appropriate shape.

In some implementations, the guide device can connect the hinge cover to the door and be disposed to pass through the position at which the hinge is disposed, thereby providing the separate simple arrangement structure.

In some implementations, the guide device can be covered by the door when viewed from the front and can be covered by the hinge when viewed from below to minimize the external exposure of the guide device.

Although this disclosure have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
- a cabinet that defines a storage space;
- a door configured to open and close at least a portion of the storage space;
- a hinge that rotatably connects the door to the cabinet and comprises a plurality of links; and
- a wire guide disposed above the hinge and configured to guide an electric wire between the cabinet and the door, wherein the wire guide comprises:
- a first guide member having a first end that is rotatably connected to the cabinet,
- a second guide member rotatably connected to a second end of the first guide member, the second guide member extending over the hinge and passing the hinge, wherein an end of the second guide member is disposed at a position closer to a front surface of the door than the hinge, and
- a third guide member that is disposed on the second guide member and defines a passage in communication with an inside of the door, wherein the third guide member extends downward from the end of the second guide member and is inserted into an upper surface of the door, and wherein the wire guide is configured to guide the electric wire from an inside of the cabinet to the inside of the door via the first guide member, the second guide member, and the third guide member.

2. The refrigerator according to claim 1, wherein the cabinet comprises a mounting portion, and the first guide member is rotatably coupled to the mounting portion.

3. The refrigerator according to claim 1, wherein the hinge comprises:
- a hinge bracket disposed at a front side of the cabinet; and
- a door bracket disposed at an upper side of the door, and wherein the plurality of links connect the door bracket to the hinge bracket.

4. The refrigerator according to claim 1, wherein the plurality of links are configured to rotate based on the door being opened and closed, and wherein the first guide member and the second guide member are configured to rotate and be folded or unfolded based on rotation of the plurality of links.

5. The refrigerator according to claim 1, wherein the third guide member has a tube shape that defines an upper opening and a lower opening, and wherein the third guide member is configured to guide the electric wire to the inside of the door through the upper and lower openings.

6. The refrigerator according to claim 1, wherein the third guide member is coupled to the door at a position spaced apart from the hinge.

7. The refrigerator according to claim 1, wherein the third guide member is rotatably disposed below the second guide member.

8. The refrigerator according to claim 1, wherein the first guide member comprises first side protrusions that extend from a first side of the first guide member, the first side protrusions being configured to restrict the electric wire from being separated from the first guide member, and wherein the second guide member comprises second side protrusions that extend from a second side of the second guide member, the second side protrusions being configured to restrict the electric wire from being separated from the second guide member.

9. The refrigerator according to claim 8, wherein the first guide member defines a first wire accommodation portion configured to guide the electric wire between the first side protrusions, and wherein the second guide member defines a second wire accommodation portion configured to guide the electric wire between the second side protrusions.

10. The refrigerator according to claim 8, wherein the first side protrusions are spaced apart from one another, and the second side protrusions are spaced apart from one another.

11. The refrigerator according to claim 1, wherein the wire guide further comprises:
- a first rotation shaft that is disposed at the first end of the first guide member and defines a rotation axis of the first guide member; and a second rotation shaft that is disposed at the second end of the first guide member and defines a rotation axis of the second guide member.

12. The refrigerator according to claim 11, wherein the first guide member comprises:

a first coupling portion including the first rotation shaft;

a second coupling portion including the second rotation shaft; and a body that extends between the first coupling portion and the second coupling portion and connects the first coupling portion and the second coupling portion to each other, and wherein a width of each of the first coupling portion and the second coupling portion is greater than a width of the body.

13. The refrigerator according to claim 1, wherein the door comprises:

an outer case that defines the front surface of the door;

a door liner that defines a rear surface of the door;

a cap decor that defines a top surface of the door; and an insulator provided in a space defined by the outer case, the door liner, and the cap decor, and wherein the third guide member is connected to the cap decor.

14. The refrigerator according to claim 13, wherein the outer case extends above the hinge and the wire guide to thereby cover front sides of the hinge and the wire guide.

15. The refrigerator according to claim 13, wherein the cap decor defines a hinge mounting portion that is recessed from an upper surface of the cap decor and accommodates the hinge.

16. The refrigerator according to claim 15, wherein the cap decor further defines a guide device mounting portion that is recessed from the upper surface of the cap decor and accommodates the third guide member, and wherein the guide device mounting portion is stepped with respect to the hinge mounting portion and defined above the hinge mounting portion.

17. The refrigerator according to claim 13, wherein the electric wire comprises a connector disposed at an end of the electric wire and configured to couple to another electric wire provided in the cabinet.

* * * * *